US010103408B2

(12) United States Patent
Wiesner et al.

(10) Patent No.: US 10,103,408 B2
(45) Date of Patent: Oct. 16, 2018

(54) SOLID-STATE THREE-DIMENSIONAL BATTERY ASSEMBLY

(71) Applicant: CORNELL UNIVERSITY, Ithaca, NY (US)

(72) Inventors: Ulrich Wiesner, Ithaca, NY (US); Joerg G. Werner, Greece, NY (US); Héctor D. Abruña, Ithaca, NY (US); Gabriel Rodriguez-Calero, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 15/753,820

(22) PCT Filed: Aug. 26, 2016

(86) PCT No.: PCT/US2016/048986
§ 371 (c)(1),
(2) Date: Feb. 20, 2018

(87) PCT Pub. No.: WO2017/040280
PCT Pub. Date: Mar. 9, 2017

(65) Prior Publication Data
US 2018/0254526 A1 Sep. 6, 2018

Related U.S. Application Data
(60) Provisional application No. 62/211,159, filed on Aug. 28, 2015.

(51) Int. Cl.
*H01M 10/05* (2010.01)
*H01M 10/0585* (2010.01)
(Continued)

(52) U.S. Cl.
CPC ..... *H01M 10/0585* (2013.01); *H01M 4/0407* (2013.01); *H01M 4/0471* (2013.01);
(Continued)

(58) Field of Classification Search
CPC ......... H01M 10/0585; H01M 10/0525; H01M 10/0565; H01M 10/052; H01M 10/058;
(Continued)

(56) References Cited

U.S. PATENT DOCUMENTS 6,096,453 A   8/2000 Grunwald
7,026,071 B2  4/2006 Mayer et al.
(Continued)

FOREIGN PATENT DOCUMENTS

CN    102598366 A    7/2012
CN    103213933 A    7/2013
(Continued)

OTHER PUBLICATIONS

International Search Report and Written Opinion of the International Search Authority for PCT/US2016/048986 dated Nov. 4, 2016.
(Continued)

*Primary Examiner* — Stephen J Yanchuk
(74) *Attorney, Agent, or Firm* — Heslin Rothenberg Farley & Mesiti P.C.

(57) ABSTRACT

A solid-state three-dimensional battery assembly includes a solid bicontinuous monolithic carbon anode, a solid electrolyte layer, and a solid cathode. The solid monolithic carbon anode has an ordered three-dimensionally continuous network nanostructure, a length of at least 100 nm, and an average thickness of 3 to 90 nm. The ordered three-dimensionally continuous network nanostructure of the anode defines a plurality of pores having an average diameter of 5 to 100 nm. The solid electrolyte layer is disposed
(Continued)

directly on the anode, has an average thickness of 3 to 90 nm, and fills a portion of the pores defined by the ordered three-dimensionally continuous network nanostructure of the anode. The solid cathode is disposed directly on the electrolyte layer, has an average thickness of 3 to 90 nm, and also fills a portion of the pores defined by the ordered three-dimensionally continuous network nanostructure of the anode. Related devices and methods are also provided.

25 Claims, 11 Drawing Sheets

(51) Int. Cl.
  *H01M 10/0525* (2010.01)
  *H01M 10/0565* (2010.01)
  *H01M 4/587* (2010.01)
  *H01M 4/38* (2006.01)
  *H01M 4/66* (2006.01)
  *H01M 4/04* (2006.01)
  *H01M 4/1393* (2010.01)
  *H01M 4/02* (2006.01)

(52) U.S. Cl.
  CPC ........... *H01M 4/1393* (2013.01); *H01M 4/38* (2013.01); *H01M 4/587* (2013.01); *H01M 4/66* (2013.01); *H01M 10/0525* (2013.01); *H01M 10/0565* (2013.01); *H01M 2004/021* (2013.01); *H01M 2004/027* (2013.01); *H01M 2220/30* (2013.01); *H01M 2300/0082* (2013.01)

(58) Field of Classification Search
  CPC ............. H01M 4/0407; H01M 4/0471; H01M 4/1393; H01M 4/38; H01M 4/458; H01M 4/66; H01M 4/131; H01M 4/505; H01M 4/485; H01M 4/525; H01M 4/02; H01M 2004/021; H01M 2004/022; H01M 2220/30; H01M 2300/0082
  See application file for complete search history.

(56) References Cited

U.S. PATENT DOCUMENTS

| | | |
|---|---|---|
| 7,709,139 B2 | 5/2010 | White et al. |
| 9,312,540 B2 | 4/2016 | Ajayan et al. |
| 2011/0027648 A1 | 2/2011 | Rolison et al. |
| 2011/0129732 A1 | 6/2011 | Bachrach et al. |
| 2011/0171518 A1* | 7/2011 | Dunn ............... H01M 4/04 429/163 |
| 2012/0282530 A1 | 11/2012 | Chiang et al. |
| 2013/0177756 A1 | 7/2013 | Lytle et al. |
| 2015/0041708 A1 | 2/2015 | Wiesner et al. |
| 2015/0079485 A1 | 3/2015 | Choi et al. |
| 2016/0028070 A1 | 1/2016 | Friesen et al. |
| 2016/0156066 A1 | 6/2016 | Gleason et al. |
| 2016/0204466 A1 | 7/2016 | Nogami et al. |

FOREIGN PATENT DOCUMENTS

| | | |
|---|---|---|
| CN | 103618056 B | 8/2015 |
| CN | 105226244 A | 1/2016 |
| WO | 2016/009249 A1 | 1/2016 |

OTHER PUBLICATIONS

Min, H.-S., et al., "Fabrication and properties of a carbon/polypyrrole three-dimensional microbattery", *Journal of Power Sources*, vol. 178, pp. 795-800 (2008).

* cited by examiner

SOLID-STATE THREE-DIMENSIONAL BATTERY ASSEMBLY

CROSS-REFERENCE TO RELATED APPLICATIONS

This application is a U.S. national phase entry under Section 371 of International Application No. PCT/US2016/048986, filed on Aug. 26, 2016, which published as WO 2017/040280 A1 on Mar. 9, 2017, which claims priority to U.S. Provisional Application No. 62/211,159, filed on Aug. 28, 2015. The entire disclosures of each of the prior applications are hereby incorporated by reference herein.

GOVERNMENT RIGHTS STATEMENT

This invention was made with Government support under Grant Numbers DE-SC0001086 and DE-SC0010560 awarded by the Department of Energy. The United States Government has certain rights in the invention.

FIELD OF THE INVENTION

This invention relates to, inter alia, a solid-state three-dimensional battery assembly and to devices comprising, and methods of using and making the same.

BACKGROUND OF THE INVENTION

Miniature devices are flooding the markets. As device size continues to decrease, it has become difficult to find batteries that fit the size and power demands of ever-shrinking electronic devices. Battery systems (e.g., lithium ion batteries (LIB)) as one option for the energy and power supply of portable and autonomous systems do not meet the requirements of miniaturized devices, and often, a battery is many times larger than the device within which one would seek to employ it. Furthermore, bridging the gap between the power densities of capacitors (fast energy release) and the energy densities of batteries (long-lasting energy) remains a fundamental problem in electrochemical energy storage (EES).

In many of devices, such as microelectromechanical systems (MEMS), or implantable medical sensors, the overall size is determined by the dimensions of the battery. Therefore, both design and functionality are dependent upon the battery assembly being employed, and its architecture. In traditional batteries, the anode and cathode materials are often compounded with a conductive additive and polymeric binder and subsequently casted onto current collectors such as metal foils. An inert and porous separator soaked in liquid electrolyte or a solid electrolyte is then sandwiched by the anode and cathode assembly. In this stacked architecture of composite electrodes, the individual layers are typically 10's to 100's of microns in thickness. While this architecture works well for the conventional use in applications such as laptops and cell phones, it is poorly transferrable to small-scale devices.

Thin film batteries, on the other hand, which are often employed in MEMS applications, have only a few micron thick electrode films that are separated by a few micron thick solid electrolyte, such as LiPON, and supported on a substrate. The areal energy density in thin film batteries is correlated to the electrode film thickness. Since the solid electrode materials are often poor ionic conductors, higher energy density typically results in a reduction of power capability.

Thus, a need exists for a new battery assembly that can be employed in microelectronic devices and other devices without unduly compromising or negatively affecting the power capabilities and/or architecture of the device.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

Briefly, the present invention satisfies the need for a new battery assembly that can be employed in microelectronic devices and other devices without unduly compromising or negatively affecting the power capabilities and/or architecture of the device. Embodiments of the invention may address one or more of the problems and deficiencies discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

Certain embodiments of the presently-disclosed solid-state three-dimensional battery assembly and related devices and methods have several features, no single one of which is solely responsible for their desirable attributes. Without limiting the scope of the solid-state three-dimensional battery assembly and related device and methods as defined by the claims that follow, their more prominent features will now be discussed briefly. After considering this discussion, and particularly after reading the section of this specification entitled "Detailed Description of the Invention," one will understand how the features of the various embodiments disclosed herein provide a number of advantages over the current state of the art. These advantages may include, without limitation, providing a battery assembly with architecture that non-inhibiting toward device size, and/or offering improved power output relative to battery size, as compared to batteries in the art.

In a first aspect, the invention provides a solid-state three-dimensional battery assembly comprising:

a solid bicontinuous monolithic carbon anode having an ordered three-dimensionally continuous network nanostructure, said anode having a length of at least 100 nm, and an average thickness of 3 to 90 nm, wherein the ordered three-dimensionally continuous network nanostructure of the anode defines a plurality of pores having an average diameter of 5 to 100 nm;

a solid electrolyte layer disposed directly on the anode, filling a portion of the pores defined by the ordered three-dimensionally continuous network nanostructure of the anode, said electrolyte layer being pinhole-free, ion-conducting but electronically insulating, and having an average thickness of 3 to 90 nm; and a solid cathode disposed directly on the electrolyte layer, filling a portion of the pores defined by the ordered three-dimensionally continuous network nanostructure of the anode, having an average thickness of 3 to 90 nm, said cathode comprising:
    an active cathode material selected from the group consisting of sulfur, selenium, redox-active polymer, and a lithium metal oxide; and
    a current collector material selected from the group consisting of metals, carbon, and a conducting polymer,
wherein the electrolyte layer is sandwiched between the anode and the cathode.

In a second aspect, the invention provides a device comprising the solid-state three-dimensional battery assembly according to the first aspect of the invention.

In a third aspect, the invention provides a method of making a solid-state three-dimensional battery assembly according to the first aspect of the invention, said method comprising:
    combining a carbon precursor and a structure-directing block copolymer to yield a self-assembled precursor/copolymer composite having an ordered three-dimensionally continuous network nanostructure that is defined by the block copolymer and the ratio of the block copolymer to the carbon precursor;
    treating the precursor/copolymer composite to remove the block copolymer, then carbonizing the carbon precursor, thereby yielding the carbon anode having an ordered three-dimensionally continuous network nanostructure;
    coating the carbon anode with a 3 to 90 nm thick pin-hole free solid electrolyte layer, thereby forming an intermediate battery assembly with open pores remaining therein; and
    backfilling the intermediate battery assembly with a cathode material (comprising active cathode material and current collector).

These and other objects, features, and advantages of this invention will become apparent from the following detailed description of the various aspects of the invention taken in conjunction with the accompanying drawings.

BRIEF DESCRIPTION OF THE DRAWINGS

The present invention will hereinafter be described in conjunction with the following drawing figures, wherein like numerals denote like elements. The depicted figures serve to illustrate various embodiments of the invention. However, the invention is not limited to the precise arrangements and instrumentalities of the embodiments depicted in the drawings. Further, as provided, like reference numerals contained in the drawings are meant to identify similar or identical elements.

FIG. 1A is a schematic representation of an embodiment of a carbon anode according to the invention. FIG. 1B is a schematic representation of an embodiment of a carbon anode conformally coated with a thin solid electrolyte layer.

FIG. 5A: Current-time traces of selected potentiostatic pulses at 0.6 V vs. Ag/Ag$^+$ of gyroidal mesoporous carbon in the supporting electrolyte demonstrate no change over 200 pulses. FIG. 5B: CVs after the potentiostatic pulses in the same solution for the supporting electrolyte (grey) and after PPO deposition (black). FIG. 5C: Current-time traces of selected potentiostatic deposition pulses of PPO on a flat carbon substrate (highly oriented pyrolytic graphite, HOPG) at 0.6 V vs. Ag/Ag$^+$ showing the very fast decrease in double layer and oxidation current over pulses. FIG. 5D: CVs after pulsed potentiostatic PPO deposition in the same solution of mG$^D$MC and HOPG showing only double layer current without a phenol oxidation peak (current of the HOPG is increased by a factor of 10 for clarity).

FIG. 6A provides resistance measurements using a two-electrode configuration of the wire-connected gyroidal mesoporous carbon anode before (black) and after (dashed, grey) PPO electropolymerization showing the increase in resistance by more than 5 orders of magnitude (the current of the PPO coated monoliths was multiplied by a factor of $10^5$ for ease of comparison). FIG. 6B shows discharge and charge curves of a PPO-coated gyroidal mesoporous carbon anode according to the invention, demonstrating reversible lithiation-delithiation through the PPO-layer.

FIG. 7C provides resistance measurements using a two-electrode configuration of the wire-connected gyroidal carbon anode without PPO coating (black) and HOPG after PPO electropolymerization (grey) showing the increase in resistance by more than 5 orders of magnitude (the current of the PPO coated HOPG was multiplied by a factor of $10^5$ for ease of comparison). FIG. 7D illustrates discharge and charge curves of PPO-coated HOPG demonstrating reversible lithiation-delithiation through the PPO-layer.

FIG. 8A: Resistance measurements of insulating gyroidal mesoporous polymer monoliths (mG$^D$MP, black) back-filled with PEDOT (light grey), and sulfur and PEDOT (dark grey) using a two-electrode configuration with contacts on either monolith surface. FIG. 8B: Cross-sectional SEM image of a sulfur-PEDOT backfilled gyroidal mesoporous polymer monolith indicating good infiltration efficiency. FIG. 8C: Cross-sectional SEM image of a sulfur-PEDOT backfilled PPO-coated gyroidal carbon monolith (3D-battery) according to an embodiment of the invention and EDX line scan of the sulfur signal across the film (line scan position indicated by black arrow in SEM and shown in FIG. 9A).

FIG. 9A: Cross-sectional SEM image of an embodiment of a 3D-battery assembly with the arrow showing the position of the line scan plotted in FIG. 8. FIG. 9B: Cross-sectional SEM image of an embodiment of a 3D-battery assembly with the points showing the position of the quantified spectra described in the text. FIG. 9C: First charge curve of an embodiment of a 3D-battery assembly described in the text to 3 V at 0.125 mA cm$^{-2}$. FIG. 9D: Current/Potential-time traces of the first 10 cycles run between 1 and 3 V at 0.125 mA cm$^{-2}$ with 15 mins rest between each applied charge or discharge current. FIG. 9E: Current/Potential-time traces of the 10$^{th}$-20$^{th}$ cycle run between 1 V (11$^{th}$+12$^{th}$) or 1.5 V (13$^{th}$-20$^{th}$) and 3.5 V at 0.125 mA cm$^{-2}$ with 15 mins rest between each applied charge or discharge current.

FIG. 10A: Photograph and schematic of a fully assembled solid-state three-dimensional battery assembly according to an embodiment of the invention after contacting the cathode phase on the top surface and before lithiation (alligator clip for the lithium metal at the right). FIG. 10B: Discharge curve of the sulfur-PEDOT phase vs. lithium metal in liquid electrolyte at 0.125 mA cm$^{-2}$. FIG. 10C: Discharge capacities of the tested cycles. The cycle conditions (voltage window and current rate) are indicated in the graph. FIG. 10D: Discharge curves of the first two cycles that were run in the potential window of 1-3.5 V at a current of 0.125 mA cm$^{-2}$ (11$^{th}$ and 12$^{th}$ cycle total). FIG. 10E: Discharge curves of selected cycles that were run in the potential window of 1.5-3.5 V at a current of 0.125 mA cm$^{-2}$ (13$^{th}$-20$^{th}$ cycle total). FIG. 10F: Discharge curves of selected cycles that were run in the potential window of 1.5-3.6 V at a current of 0.25 mA cm$^{-2}$ (21$^{st}$-30$^{th}$ cycle total).

FIG. 11A: Charge-discharge curves of the first two cycles that were run in the potential window of 1-3.5 V at a current of 0.125 mA cm$^{-2}$ (11$^{th}$ and 12$^{th}$ cycle total). FIG. 11B: Charge and discharge curves of selected cycles that were run in the potential window of 1.5-3.5 V at a current of 0.125 mA cm$^{-2}$ (13$^{th}$-20$^{th}$ cycle total). FIG. 11C: Discharge curves of selected cycles that were run at a current of 0.125 mA cm$^{-2}$ (11$^{th}$-20$^{th}$ cycle total). FIG. 11D: Charge and discharge curves of selected cycles that were run in the potential window of 1.5-3.6 V at a current of 0.25 mA cm$^{-2}$ (21$^{st}$-30$^{th}$ cycle total). FIG. 11E: Charge and discharge capacities of tested cycles. The cycle conditions (voltage window and current rate) are indicated in the graph. FIG. 11F: Cycle efficiencies (coulombic efficiencies) of tested cycles. The cycle conditions (voltage window and current rate) are indicated in the graph.

DETAILED DESCRIPTION OF THE INVENTION

Figure 1:
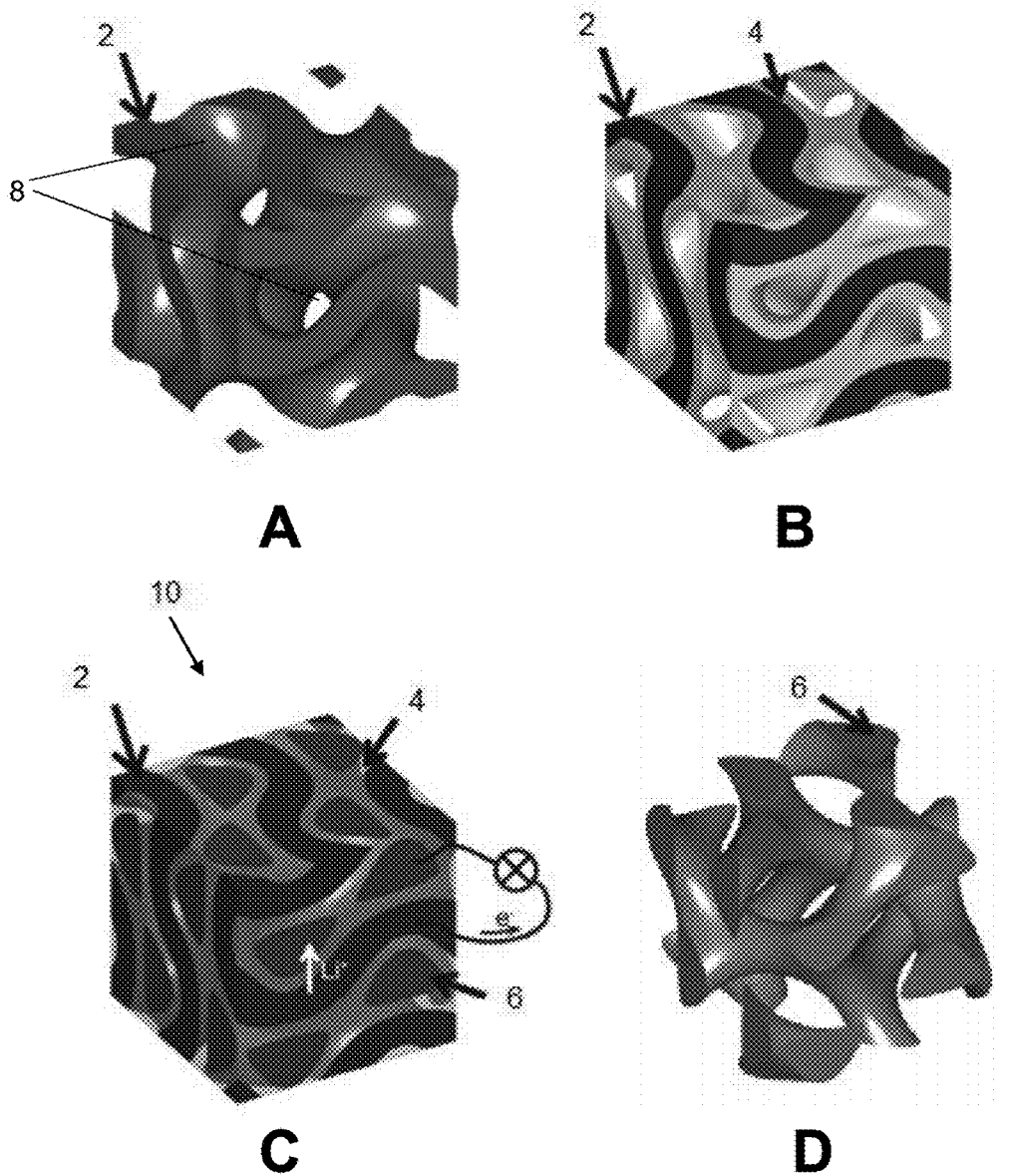
FIGS. 1A-B are representations of electrodes, electrolyte, and an assembly according to certain embodiments of the invention.
FIG. 1C is a schematic of one embodiment of a battery assembly according to the invention.
FIG. 1D is a schematic of one embodiment of a cathode according to the invention.

The present invention relates to, inter alia, a solid-state three-dimensional battery assembly and to devices comprising, and methods of using and making the same.

Aspects of the present invention and certain features, advantages, and details thereof are explained more fully below with reference to the non-limiting embodiments illustrated in the accompanying drawings. Descriptions of well-known materials, fabrication tools, processing techniques, etc., are omitted so as to not unnecessarily obscure the invention in detail. It should be understood, however, that the detailed description and the specific examples, while indicating embodiments of the invention, are given by way of illustration only, and are not by way of limitation. Various substitutions, modifications, additions and/or arrangements within the spirit and/or scope of the underlying inventive concepts will be apparent to those skilled in the art from this disclosure.

Reference is made below to the drawings, which are not necessarily drawn to scale for ease of understanding, wherein the same reference numerals retain their designation and meaning for the same or like elements throughout the various drawings.

As mentioned briefly above, portable electronics including communication devices, sensors, hand-held entertainment devices, and autonomous systems such as monitoring devices are becoming increasingly distributed and at the same time smaller in size. While the field of electronics has miniaturized the active parts of these devices tremendously over the past decades, mobile energy sources necessary for these disconnected systems lack far behind the demand. Battery systems like lithium ion batteries (LIB) as one option for the energy and power supply of portable and autonomous systems do not meet the requirements of miniaturized devices, and the battery is often many times larger than the device. Furthermore, bridging the gap between the power densities of capacitors (fast energy release) and the energy densities of batteries (long-lasting energy) remains a fundamental problem in electrochemical energy storage (EES). Batteries thus have to be improved in several categories, including, for example: Energy density (per mass, volume and footprint), power capability, variable power output, and/or longevity, to name a few.

One attempt at solving the above problems involves using porous structured nanomaterials. However, while the specific energy and power density (per mass) is often improved in these nanomaterials, volumetric and areal densities are tough to assess. These metrics suffer under the high porosity of nanostructured materials and, additionally, the extra electrolyte necessary to fill the highly porous nanomaterials adds significantly to the total system weight and therefore further decreases the total energy density of the device.

These issues are particularly detrimental for the use of batteries as energy source in devices such as microelectromechanical systems (MEMS), or implantable medical sensors, where a small footprint and volume of the energy source is crucial. In fact, in many of these devices, the overall size is determined by the dimensions of the battery. The problem lies in the battery assembly and its architecture. In traditional batteries, the anode and cathode materials can be compounded with some conductive additive and polymeric binder and subsequently casted onto current collectors such as metal foils. An inert and porous separator soaked in liquid electrolyte or a solid electrolyte is then sandwiched by the anode and cathode assembly. In this stacked architecture of composite electrodes the individual layers are typically 10's to 100's of microns thick. While this architecture can work well for conventional use in applications such as laptops and cell phones, it is poorly transferrable to small-scale devices.

Thin film batteries, on the other hand, which are often employed in MEMS applications, have only a few micron thick electrode films that are separated by a few micron thick solid electrolyte, such as LiPON, and supported on a substrate. The areal energy density in thin film batteries is correlated to the electrode film thickness. Since the solid electrode materials are often poor ionic conductors, higher energy density typically yields in a reduction of power capability.

Embodiments of the present invention unlink the areal energy density from the power capabilities by providing an entire battery assembly with all components integrated into a three-dimensional nanoarchitecture. In the three-dimensional battery assembly of the invention, the three-layer design of anode-electrolyte-cathode is still present, but on the nanoscale, while at the same time utilizing the third dimension to increase areal energy density without increasing the electrode thicknesses. This architecture assists in ensuring that the energy density increase by exploiting thicker films does not decrease the rate of energy accessibility or even the utilization efficiency of the active material, since the electrode-to-electrode distance is independent of device thickness.

3D battery assemblies have been proposed, with architectures of interdigitated pillar-like and plate-like electrodes, as well as porous rod-arrays. Some of the proposed architectures have been realized, but only on the micron scale. For example, Min et al. (Min, H.-S.; Park, B. Y.; Taherabadi, L.; Wang, C.; Yeh, Y.; Zaouk, R.; Madou, M. J.; Dunn, B. Fabrication and Properties of a Carbon/polypyrrole Three-Dimensional Microbattery. *J. Power Sources* 2008, 178, 795-800) employed photolithography to generate interdigitated carbon rods where each alternating row of rods was separately electronically accessible. This way, every other row was functionalized with a polypyrrole coating and it was demonstrated that this architecture exhibited a higher energy density than a similarly prepared planar film. The 3D-battery performance of such an assembly is limited, however, due to shortage between the opposing electrode rods.

Further, in view of conventional wisdom (e.g., to ensure fast ion transport between electrodes), attempts at making 3D batteries employ liquid electrolyte between the electrodes with microns of separation distance. While this assures fast ion transport between anode and cathode, sealing of the device and flammability of organic liquid electrolytes pose challenges and safety concerns. The inefficient use of space due to the large "dead" volume of the electrolyte might also yield in limitations of these designs.

Solid-state 3D-battery assemblies would avoid these limitations and offer a safe alternative. However, such devices have primarily been accomplished on the macro scale. While a significant areal energy density improvement compared to the planar architectures is obtained for these 3D-batteries, power capabilities suffer under the microns of solid-state ion-diffusion.

Embodiments of the solid-state three-dimensional battery assembly and related methods of the present invention address the needs discussed above.

In a first aspect, the invention provides a solid-state three-dimensional battery assembly comprising:

a solid bicontinuous monolithic carbon anode having an ordered three-dimensionally continuous network nanostructure, said anode having a length of at least 100 nm, and an average thickness of 3 to 90 nm, wherein the ordered three-dimensionally continuous network nanostructure of the anode defines a plurality of pores having an average diameter of 5 to 100 nm;

a solid electrolyte layer disposed directly on the anode, filling a portion of the pores defined by the ordered three-dimensionally continuous network nanostructure of the anode, said electrolyte layer being pinhole-free, ion-conducting but electronically insulating, and having an average thickness of 3 to 90 nm; and a solid cathode disposed directly on the electrolyte layer, filling a portion of the pores defined by the ordered three-dimensionally continuous network nanostructure of the anode, having an average thickness of 3 to 90 nm, said cathode comprising:

an active cathode material selected from the group consisting of sulfur, selenium, redox-active polymer, and a lithium metal oxide; and a current collector material selected from the group consisting of metals, carbon, and a conducting polymer, wherein the electrolyte layer is sandwiched between the anode and the cathode.

As used herein, the term "solid-state three-dimensional battery assembly" refers to a battery structure as described above in accordance with the first aspect of the invention, having the solid bicontinuous monolithic carbon anode, solid electrolyte layer, and solid cathode.

In the inventive solid-state three-dimensional battery assembly (alternatively referred to herein as the "battery assembly"), all components (electrodes, solid electrolyte) are three-dimensional (i.e. networked) with the indicated dimensions. Both electrode phases are electronically conducting or composited with a current collecting material on the nanoscale.

The solid bicontinuous monolithic carbon anode (interchangeably referred to herein as the "carbon anode" or the "anode") is comprised of over 70 atomic % carbon, with an ordered three-dimensional nanostructure. The term "monolithic" as used herein means that the carbon anode is a single, solid unbroken structure. The term "bicontinuous" as used herein means that the carbon anode is continuous in both carbon and the plurality of pores defined by the carbon anode structure, in a convoluted 3D structure, the length of which spans the whole battery assembly. As referred to herein, length of the carbon anode would be the unwrapped 2-D planar sheet length of the carbon anode, if it were laid flat, as opposed to the 3-D structure that it assumes in the inventive battery assembly. The bicontinuous carbon anode of the invention is distinguished from, e.g., anodes having pillar-type structures (or other discrete appendage-type structures), since pillars are discrete structures (even if they share, e.g., a base or common substrate) that terminate at a specific point, whereas a bicontinuous anode, accompanied by the pores that it defines, has two phases (the anode and the pores, which, in the battery assembly, comprise the electrolyte and cathode layer) that are continuous throughout a battery assembly, without portions of the anode or the pores terminating in any discrete structures. Thus, both the carbon anode and the porous phase that it defines are continuous in 3-D. So, taken together, the electrolyte layer and cathode, which occupy the pores defined by the anode, are also cocontinuous. In combination, the anode-electrolyte-cathode structure (3-D battery assembly) is triply continuous, as it has three phases that are continuous in 3-D.

The carbon anode has an ordered three-dimensionally cocontinuous network nanostructure (the bicontinuous structure of the anode is three-dimensional). As used herein, the term "ordered three-dimensionally continuous network nanostructure" indicates that the anode structure is ordered and periodic in three dimensions. As used herein, "ordered and periodic in three dimensions" means that the structure is made up of repeating units that periodically repeat in an ordered succession or sequence in any direction of the three-dimensional space. An ordered structure is readily distinguishable from a disordered non-periodic structure (as, for example, disclosed in U.S. Pat. No. 7,709,139).

In some embodiments, the solid bicontinuous monolithic carbon anode has an ordered cubic three-dimensional nanostructure.

The components (anode, electrolyte layer, and cathode) of the inventive battery assembly are interdigitated in three dimensions. This means that, going from any point in the structure of the battery assembly in any direction in three-dimensional space, there is a periodic repetition of //anode//electrolyte//cathode//electrolyte// . . . . Embodiments of the inventive battery assembly thus differ from, e.g., batteries employing pillar-like structures, in which this repetition only happens in two directions (in-plane), rather than in three dimensions.

FIG. 1A is a schematic representation of an embodiment of a carbon anode 2 according to the invention. The ordered three-dimensionally continuous network nanostructure of the anode depicted in FIG. 1A is a cubic double gyroidal structure. Carbon anode 2 has an average thickness of 16-17 nm, and defines a plurality of pores 8 having an average diameter of 40 nm.

The anodic structure is referred to herein as "an ordered three-dimensionally continuous network nanostructure." This is because the anode (as well as the other battery components, such as the electrolyte layer and cathode) has a thickness on the nanoscale. Nevertheless, since the anode is in a periodic three-dimensional network, where a sufficient number of anode repeating units are present, the nanoscale dimensions of the anode can percolate throughout the battery assembly so as to form a macroscopic free-standing architecture. In other words, the network structure of the anode can be sufficiently long (as the length of the anode is not limited to the nanoscale), such that a three-dimensional anode and battery assembly according to the invention can exist as a cell/monolith having macroscopic dimensions. Indeed, the anode monoliths 100 of FIG. 2A have thicknesses of approximately 60-70 microns and geometrical areas of 8-12 mm$^2$, yet they are still carbon anodes having an ordered three-dimensionally continuous network nanostructure according to battery assembly embodiments of the invention.

The anode of the inventive battery assembly has a length of at least 100 nm. In some embodiments, the length of the anode ranges from 100 nm to several microns, or even several meters. In certain non-limiting embodiments, the length of the anode ranges from 100 nm to 2 meters (e.g., 100 nm, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, or 990 nm; 1 μm, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, or 990 μm; 1 mm, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, or 990 mm; 1 m, or 2 m), including any and all ranges and subranges therein.

The carbon anode has an average thickness of 3 to 90 nm (e.g., 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 nm), including any and all ranges and subranges therein (e.g., 5 to 25 nm, 8 to 20 nm, 10 to 19 nm, etc.). In some embodiments, the carbon anode has an average thickness of less than 50 nm (e.g., a thickness of 3 to 49 nm, including any and all ranges and subranges therein). In some embodiments, the carbon anode has an average thickness of less than 20 nm.

In some embodiments, the anode occupies 20 to 60 vol % of the battery assembly (e.g., 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 vol. %), including any and all ranges and subranges therein.

The ordered three-dimensionally continuous network nanostructure of the anode defines a plurality of pores having an average diameter of 5 to 100 nm (e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 nm), including any and all ranges and subranges therein (e.g., 5 to 70 nm, 10 to 50 nm, 15 to 50 nm, 20 to 45 nm, etc.). In some embodiments, the pores have an average diameter of greater than 12 nm, greater than 15 nm, greater than 20 nm, greater than 25 nm, greater than 30 nm, or greater than 35 nm.

In some embodiments, the carbon anode comprises no nitrogen. In some embodiments, the carbon anode comprises less than 2 atomic % nitrogen.

In some embodiments, the ordered three-dimensionally continuous network nanostructure of the anode is a gyroidal structure.

In some embodiments, the ordered three-dimensionally continuous network nanostructure of the anode comprises a double gyroidal morphology or a single gyroidal morphology. In particular embodiments, the ordered three-dimensionally continuous network nanostructure of the anode comprises a double gyroidal morphology. In other particular embodiments, the ordered three-dimensionally continuous network nanostructure of the anode comprises a single gyroidal morphology.

Generally, a single gyroidal mesoporous carbon exhibits a structure that belongs to the space group I4$_1$32 and can be described mathematically as the volume enclosed by the surface that is constructed by:

$$\sin(x)\cos(y)+\sin(y)\cos(z)+\sin(z)\cos(x)=u$$

with u being non-zero.

Generally, a double gyroidal mesoporous carbon exhibits a structure that belongs to the space group Ia$\bar{3}$d and can be described mathematically as the volume enclosed by the surface that is constructed by $$(\sin(x)\cos(y)+\sin(y)\cos(z)+\sin(z)\cos(x))^2=v$$

with v being a positive number.

As provided herein, the solid bicontinuous monolithic carbon anode is tunable for various characteristics, including, without limitation, characteristics such as porosity, pore volume, pore size, thermal stability, length, thickness, and the like.

In certain embodiments, the solid bicontinuous monolithic carbon anode has a porosity of between about 30 and about 80 volume percent (vol %) (e.g., 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 vol %), including any and all ranges and subranges therein. In some embodiments, the carbon anode has a porosity of about 30-75 vol %, about 30-70 vol %, about 30-65 vol %, about 30-60 vol %, about 30-55 vol %, about 30-50 vol %, about 30-45 vol %, about 30-40 vol %, or about 30-35 vol %. In some embodiments, the carbon anode has a porosity of about 35-80 vol %, about 40-80 vol %, about 45-80 vol %, about 50-80 vol %, about 55-80 vol %, about 60-80 vol %, about 65-80 vol %, about 70-80 vol %, or about 75-80 vol %.

In certain embodiments, the carbon anode has a pore volume of between about 0.25 and about 2.0 cm$^3$ g$^{-1}$ (e.g., 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, or 2.0 cm$^3$ g$^{-1}$), including any and all ranges and subranges therein. In some embodiments, the carbon anode defines a pore volume of about 0.25-1.9 cm$^3$ g$^{-1}$, about 0.25-1.8 cm$^3$ g$^{-1}$, about 0.25-1.7 cm$^3$ g$^{-1}$, about 0.25-1.6 cm$^3$ g$^{-1}$, about 0.25-1.5 cm$^3$ g$^{-1}$, about 0.25-1.4 cm$^3$ g$^{-1}$, about 0.25-1.3 cm$^3$ g$^{-1}$, about 0.25-1.2 cm$^3$ g$^{-1}$, about 0.25-1.1 cm$^3$ g$^{-1}$, about 0.25-1.0 cm$^3$ g$^{-1}$, about 0.25-0.9 cm$^3$ g$^{-1}$, about 0.25-0.8 cm$^3$ g$^{-1}$, about 0.25-0.7 cm$^3$ g$^{-1}$, about 0.25-0.6 cm$^3$ g$^{-1}$, about 0.25-0.5 cm$^3$ g$^{-1}$, about 0.25-0.4 cm$^3$ g$^{-1}$, or about 0.25-0.3 cm$^3$ g$^{-1}$. In some embodiments, the carbon anode defines a pore volume of about 0.3-2.0 cm$^3$ g$^{-1}$, about 0.4-2.0 cm$^3$ g$^{-1}$, about 0.5-2.0 cm$^3$ g$^{-1}$, about 0.6-2.0 cm$^3$ g$^{-1}$, about 0.7-2.0 cm$^3$ g$^{-1}$, about 0.8-2.0 cm$^3$ g$^{-1}$, about 0.9-2.0 cm$^3$ g$^{-1}$, about 1.0-2.0 cm$^3$ g$^{-1}$, about 1.1-2.0 cm$^3$ g$^{-1}$, about 1.2-2.0 cm$^3$ g$^{-1}$, about 1.3-2.0 cm$^3$ g$^{-1}$, about 1.4-2.0 cm$^3$ g$^{-1}$, about 1.5-2.0 cm$^3$ g$^{-1}$, about 1.6-2.0 cm$^3$ g$^{-1}$, about 1.7-2.0 cm$^3$ g$^{-1}$, about 1.8-2.0 cm$^3$ g$^{-1}$, or about 1.9-2.0 cm$^3$ g$^{-1}$.

Pore volume and porosity can be calculated using methods known in the art. For example, pore volume can be obtained from the amount of nitrogen adsorbed at a relative pressure of 0.99. The porosity can be calculated using the specific volume for carbon (inverse carbon density) of 0.5 cm$^3$/g with the formula: Porosity (vol %)=Pore Volume (cm$^3$/g)/(Pore Volume (cm$^3$/g)+0.5 cm$^3$/g)×100.

In certain embodiments, the carbon anode has an ordered three-dimensionally continuous network nanostructure that is thermally stable at temperatures at least greater than 1250° C. and up to about 2000° C., including any and all ranges and subranges therein. In certain embodiments, the structure of the carbon anode is thermally stable at temperatures of up to about 1200° C., up to about 1225° C., up to about 1250° C., up to about 1275° C., up to about 1300° C., up to about 1325° C., up to about 1350° C., up to about 1375° C., up to about 1400° C., up to about 1425° C., up to about 1450° C., up to about 1475° C., up to about 1500° C., up to about 1525° C., up to about 1550° C., up to about 1575° C., up to about 1600° C., up to about 1625° C., up to about 1650° C., up to about 1675° C., up to about 1700° C., up to about 1725° C., up to about 1750° C., up to about 1775° C., up to about 1800° C., up to about 1825° C., up to about 1850° C., up to about 1875° C., up to about 1900° C., up to about 1925° C., up to about 1950° C., or up to about 1975° C.

In some embodiments, the carbon anode further comprises nanopores to provide increased surface area. As used herein, the term "nanopore" generally refers to a pore having a diameter of less than about 5 nm. Nanopores in the carbon anode can be obtained via low temperature (e.g., 600° C. or above) carbonization, or activation (e.g., with $CO_2$ at temperatures above 850° C.).

In another embodiment, the gyroidal mesoporous carbon composition further comprises a dopant. As used herein, the term "dopant" refers to various elements that may be added to the carbon phase of the inventive battery assembly. More particularly, a "dopant" as used herein refers to a group III, group V, or group VI element as defined herein below. According to the present disclosure, a group III element is an element of the third main group of the periodic table that can act as an electron acceptor. Suitable examples of group III elements include boron and aluminum. According to the present disclosure, a group V or group VI element is an element of the fifth or sixth main groups of the periodic table that can act as an electron donor. Suitable examples of group V or group VI elements include nitrogen, phosphorous, arsenic, antimony, or oxygen, sulfur, selenium, and tellurium.

In some embodiments, the anode has a repeat distance (i.e., distance from center to center of adjacent repeat units of the anode) of 20 to 100 nm (e.g., 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 nm), including any and all ranges and subranges therein (e.g., 30 to 80 nm, 40 to 70 nm, 50 to 60 nm, etc.).

In some embodiments, conductive additives or binders that are commonly employed in standard composite electrodes are absent in anode and cathode. In these and other embodiments, the electrode phases of the inventive battery assembly are electrically conducting, either intrinsically or in form of a composite, to make their redox-activity electrically accessible.

In some embodiments, carbon in the carbon anode serves as the only active anode material, such that no additional active anode material is present. In other embodiments, the carbon anode additionally comprises another active anode material. For example, in some embodiments, additional active anode material is selected from the group consisting of inorganics such as silicon, and (lithium) metal oxides such as lithium titanate or titania, as well as organic and polymeric materials with lower redox-potentials than the cathode material.

In some embodiments, carbon in the carbon anode serves as the only current collector material in the anode, such that no additional current collector material is present. In other embodiments, the anode additionally comprises another current collector material. For example, in some embodiments, the anode additionally comprises one or more current collector materials selected from the group consisting of metals, conducting polymers or other conducting organics, some of which can also optionally exhibit redox-activity.

In some embodiments, the anode is lithiated.

As mentioned above, the inventive battery assembly includes a solid electrolyte layer disposed directly on the anode, sandwiched between the anode and the cathode. FIG. 1B is a schematic representation of an embodiment of a carbon anode 2 conformally coated with a thin solid electrolyte layer 8. As shown in FIG. 1B, the electrolyte layer 4 of the inventive battery assembly fills a portion of the pores 8 (see FIG. 1A) defined by the ordered three-dimensionally continuous network nanostructure of the anode 2.

The electrolyte layer is pinhole-free. As used herein, the term "pinhole-free" refers to a continuous layer that is free of holes therein. Accordingly, for example, when a material consisting of aggregates or molecules larger than 1 nm comes into contact with a pinhole-free layer, the aggregate does not infiltrate toward the base of the layer. Since the electrolyte layer is pin-hole free, it is ensured that the cathode does not come into contact with the anode.

The electrolyte layer is ion-conducting but electronically insulating. In some embodiments, the electrolyte layer has an ionic conductivity of greater than $10^{-10}$ Scm$^{-1}$. In some embodiments, the electrolyte layer has an ionic conductivity of greater than $10^{-8}$ Scm$^{-1}$. In some embodiments, the electrolyte layer maintains electronic insulating such that $\sigma_{electronic}<10^{-10}$ Scm$^{-1}$.

The electrolyte layer has an average thickness of 3 to 90 nm (e.g., 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 nm), including any and all ranges and subranges therein (e.g., 5 to 25 nm, 8 to 20 nm, 10 to 19 nm, etc.). In some embodiments, the electrolyte layer has an average thickness of less than 50 nm (e.g., a thickness of 3 to 49 nm, including any and all ranges and subranges therein). In some embodiments, the electrolyte layer has an average thickness of less than 20 nm.

In some embodiments, the electrolyte layer is polymeric. In some embodiments, the electrolyte layer is ceramic.

In particular embodiments, the electrolyte layer is conformal, uniform in thickness throughout the entire anode framework, has sufficiently high electrical resistance, and is ionically conductive. In some embodiments, the thickness of the electrolyte layer along the entire anode structure does not vary by more than 2 nm. For example, in some embodiments, the thickness of the electrolyte layer along the entire anode structure varies by less than 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, or 1.9 nm.

It is well within the purview of a person having ordinary skill in art to select an appropriate material for the electrolyte layer. In some embodiments, the electrolyte layer comprises a polyether, such as poly(ethylene oxide), poly(propylene oxide), poly(phenylene oxide). In some embodiments, the electrolyte layer comprises a polycarbonate or polyester, such as poly(trimethylene carbonate) or poly(ε-caprolactone). In some embodiments, the electrolyte layer comprises a member selected from the group consisting of poly(ethylene oxide), poly(propylene oxide), poly(trimethylene carbonate), poly(ε-caprolactone), poly(dimethylsiloxane), poly (vinylidene fluoride-hexafluoropropylene), poly (acrylonitrile), poly(ortho-phenylene diamine), and poly (phenylene oxide). In some embodiments, the electrolyte layer is a linear polymer. In some embodiments, the electrolyte layer is a cross-linked polymer. In particular embodiments, the electrolyte layer comprises poly(phenylene oxide).

In some embodiments, the electrolyte layer occupies 3 to 50 vol. % of the pores defined by the ordered three-dimensionally continuous network nanostructure of the anode (e.g., 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 vol. %), including any and all ranges and subranges therein.

In some embodiments, the electrolyte layer occupies 10 to 50 vol % of the battery assembly (e.g., 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 vol. %), including any and all ranges and subranges therein.

As mentioned above, the battery assembly includes a solid cathode that is disposed directly on the electrolyte layer. Similar to the electrolyte layer, the cathode also fills a portion of the pores defined by the ordered three-dimensionally continuous network nanostructure of the anode. FIG. 1C is a schematic of one embodiment of a battery assembly 10 according to the present invention. As depicted, battery assembly 10 includes carbon anode 2, cathode 6, and electrolyte layer 4, which is conformally coated on carbon anode 2, and is sandwiched between anode 2 and cathode 6. For, inter alia, ease of understanding FIGS. 1A-1C relative to one another, FIG. 1D is a schematic of the cathode 6 of the battery assembly 10 of FIG. 1C.

The cathode of the battery assembly has an average thickness of 3 to 90 nm (e.g., 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 nm), including any and all ranges and subranges therein (e.g., 5 to 25 nm, 8 to 20 nm, 10 to 19 nm, etc.). In some embodiments, the cathode has an average thickness of less than 50 nm (e.g., a thickness of 3 to 49 nm, including any and all ranges and subranges therein). In some embodiments, the cathode has an average thickness of less than 20 nm.

The cathode comprises: an active cathode material selected from the group consisting of sulfur, selenium, redox-active polymer, and a lithium metal oxide; and a current collector material selected from the group consisting of metals, carbon, and a conducting polymer. In some embodiments, the active cathode material and the current collector material are the same material. In some embodiments, the active cathode material and the current collector material are different materials. In some embodiments, where the active cathode material and the current collector material are different materials, they are present in a mixture. In some embodiments, where the active cathode material and the current collector material are different materials, they are present in a mixture that is of substantially homogeneous (i.e., greater than or equal to 98% uniform) composition. In some embodiments, where the active cathode material and the current collector material are different materials, they are present in a core-shell structure.

In some embodiments, the cathode comprises sulfur as the active cathode material.

In some embodiments, the cathode comprises a conducting polymer (e.g., poly(ethylene dioxothiophene)) as the current collector material.

In some embodiments, the cathode comprises sulfur as the active cathode material and a conducting polymer as the current collector material. In some such embodiments, the conducting polymer is poly(ethylene dioxothiophene). In some such embodiments, the sulfur is lithiated.

In some embodiments, the cathode comprises lithium transition metal compounds such as lithium cobalt oxide, lithium manganese oxides, lithium nickel oxides, or mixtures thereof, or lithium iron phosphate.

In some embodiments, the cathode occupies 3 to 97 vol. % of the pores defined by the ordered three-dimensionally continuous network nanostructure of the anode (e.g., 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, or 97 vol. %), including any and all ranges and subranges therein.

In some embodiments, the cathode occupies 20 to 60 vol % (e.g., 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 vol. %) of the battery assembly, including any and all ranges and subranges therein.

In some embodiments, the cathode has a repeat distance (i.e., distance from center to center of adjacent repeat units of the cathode) of 20 to 100 nm (e.g., 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 nm), including any and all ranges and subranges therein (e.g., 30 to 80 nm, 40 to 70 nm, 50 to 60 nm, etc.).

In some embodiments, the cathode is lithiated and is present in reduced state. In some embodiments, the cathode comprises sulfur as the active cathode material, and the sulfur is lithiated.

In some embodiments, the battery assembly consists of the anode, electrolyte layer, and cathode.

In some embodiments, the anode, electrolyte layer, and cathode collectively occupy at least 85 vol % of the inventive battery assembly. For example, in some embodiments where the anode, electrolyte layer and cathode occupy 85 vol % of the battery assembly, this means that the remaining 15 vol % of the battery assembly (present in unfilled pore space) remains unoccupied. In some embodiments, the anode, electrolyte layer, and cathode collectively occupy 85 to 100 vol % (e.g., 85, 86, 87, 88, 89, 90, 91, 92, 93, 94, 95, 96, 97, 98, 98.5, 98.6, 98.7, 98.8, 98.9, 99.0, 99.1, 99.2, 99.3, 99.4, 99.5, 99.6, 99.7, 99.8, 99.9, or 100 vol %) of the inventive battery assembly, including any and all ranges and subranges therein (e.g., 90 to 100 vol. %, 95 to 99.9 vol. %, etc.).

In some embodiments, solid polymers in the battery assembly such as a polymer electrolyte or polymer current collector can contain some liquid electrolyte and be present in a liquid swollen state, but still solid in nature.

In some embodiments, the battery assembly is free of liquid electrolyte.

In some embodiments of the invention, a battery assembly that has two electrodes is used singly. In other embodiments, multiple battery assemblies are connected in series or parallel to form an array.

Persons having ordinary skill in the art will recognize that thicker battery assembles (monoliths) will typically have higher capacities. In some embodiments, the inventive battery assembly has a discharge capacity of up to 500 mAh $cm^{-2}$.

In some embodiments, the inventive battery assembly has a reversible discharge plateau of 1 to 4.5 V (e.g., 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, or 4.5 V), including any and all ranges and subranges therein.

Certain embodiments of the inventive battery assembly demonstrate discharge capacities up to 2.6 mAh $cm^{-2}$, and a reversible discharge plateau at 2.7 V with capacities of up to 0.25 mAh $cm^{-2}$.

In a second aspect, the invention provides a device comprising the solid-state three-dimensional battery assembly according to the first aspect of the invention.

In some embodiments, the device is a battery comprising a plurality of battery assemblies, at least one of which is the battery assembly according to the first aspect of the invention. In some embodiments, the device is a battery comprising a plurality of battery assemblies according to the first aspect of the invention.

In some embodiments, the device is a sensor (e.g., an implantable medical sensor). In some embodiments, the devices is a MEMS device.

In some embodiments, the device is a chip. In some embodiments, the device is an electrical device comprising the chip.

In some embodiments, the device can actively release substances (e.g., a drug-releasing implantable medical device).

In a third aspect, the invention provides a method of making a solid-state three-dimensional battery assembly according to the first aspect of the invention, said method comprising:

combining a carbon precursor and a structure-directing block copolymer to yield a self-assembled precursor/copolymer composite having an ordered three-dimensionally continuous network nanostructure that is defined by the block copolymer and the ratio of the block copolymer to the carbon precursor;

treating the precursor/copolymer composite to remove the block copolymer, then carbonizing the carbon precursor, thereby yielding the carbon anode having an ordered three-dimensionally continuous network nanostructure;

coating the carbon anode with a 3 to 90 nm thick pin-hole free solid electrolyte layer, thereby forming an intermediate battery assembly with open pores remaining therein; and backfilling the intermediate battery assembly with a cathode (comprising active cathode material and current collector).

Acceptable methods of using a block copolymer as a soft template for an ordered carbonized structure are described in Applicants' earlier application, U.S. 2015-0041708, and can be used herein to form the carbon anode.

Carbonizing the carbon precursor results in the formation of the carbon anode, which is a carbonized anode. In some embodiments, carbonizing is carried out at a temperature of about 500° C. to about 1,500° C.

Coating the carbon anode with the electrolyte layer may be performed using any art-acceptable process(es). In some embodiments, coating comprises electrochemically coating the electrolyte layer onto the anode.

In particular embodiments, the electrolyte layer is coated on the anode using electropolymerization. Advantages of electropolymerization are multifold. Surface reaction time can be precisely controlled through the application of the oxidation potential. This gives the possibility of decoupling the polymerization event from the monomer or reactant diffusion through the nanoporosity, which is particularly important for macro-scaled monolithic materials. Monomers such as ortho-phenylene diamine (OPD) and phenol form insulating polymeric films when oxidatively deposited under basic conditions. The electrical insulation results in self-limiting polymerization and at the same time causes a beneficial self-regulating synthesis to afford conformal and complete deposition. The self-regulation stems from the attraction of monomers diffusing towards the surface to areas with the highest electric field density, leading to the propensity of deposition on previously uncoated areas until the entire surface is homogeneously covered. Due to the higher electrical resistance and deposition in organic solvent, which aids solution infiltration and wetting of the hydrophobic carbon pores, poly(phenylene oxide) (PPO) is used in various embodiments of the invention as the solid polymer electrolyte.

Backfilling with the cathode (comprising active cathode material and current collector) can also be performed using any art-acceptable process(es). In some embodiments, backfilling with the cathode comprises liquid infiltration and/or solution infiltration. As is known in the art, liquid infiltration is an appropriate technique for materials with low melting points (e.g., sulfur), whereas solution infiltration is applicable to any material with soluble precursors (e.g., PEDOT).

Where the anode or cathode is lithiated (present in the reduced state), lithiation can be accomplished prior to or post-assembly through, e.g., chemical or electrochemical methods.

Embodiments of the inventive method provide for assembly of an all-integrated battery on the nanoscale, which entails precise spatial control over the synthesis and deposition of every individual component. The methods allow for fabrication of electrodes that are continuous throughout the entire battery assembly and exhibit no bottlenecks.

In some embodiments, the bock copolymer is a triblock terpolymer. As used herein, the term "triblock terpolymer" generally refers to a triblock terpolymer having two hydrophobic or non-hydrophilic blocks and a hydrophilic endblock, and more particularly to a non-frustrated triblock terpolymer having two hydrophobic or non-hydrophilic blocks and a hydrophilic endblock. For example, a triblock terpolymer used in the present invention would have three block phases, as follows: a first hydrophobic phase, a second hydrophobic phase, and a hydrophilic phase. The hydrophilic phase is always an end polymer of the triblock terpolymer. For example, a generic structure of the triblock terpolymer would be as follows: Hydrophobic Polymer A-block-Hydrophobic Polymer B-block-Hydrophilic Polymer C.

Suitable examples of triblock terpolymers include, without limitation, the following:

poly(isoprene)-block-poly(styrene)-block-poly(ethylene oxide),
poly(isoprene)-block-poly(styrene)-block-poly(4-vinyl pyridine),
poly(isoprene)-block-poly(styrene)-block-poly(2-vinyl pyridine),
poly(isoprene)-block-poly(styrene)-block-poly(glycidyl methacrylate),
poly(isoprene)-block-poly(styrene)-block-poly(dimethyl amino ethyl methacrylate),
poly(isoprene)-block-poly(styrene)-block-poly(methacrylic acid),
poly(butadiene)-block-poly(styrene)-block-poly(ethylene oxide),
poly(butadiene)-block-poly(styrene)-block-poly(4-vinyl pyridine),
poly(butadiene)-block-poly(styrene)-block-poly(2-vinyl pyridine),
poly(butadiene)-block-poly(styrene)-block-poly(glycidyl methacrylate),
poly(butadiene)-block-poly(styrene)-block-poly(dimethyl amino ethyl methacrylate),
poly(butadiene)-block-poly(styrene)-block-poly(methacrylic acid),
poly(isoprene)-block-poly(styrene)-block-Polymer X,
poly(isoprene)-block-poly(styrene)-block-Polymer X,
poly(isoprene)-block-poly(styrene)-block-Polymer X,
poly(isoprene)-block-poly(styrene)-block-Polymer X,
poly(isoprene)-block-poly(styrene)-block-Polymer X,
poly(isoprene)-block-poly(styrene)-block-Polymer X,
poly(butadiene)-block-poly(styrene)-block-Polymer X,
poly(butadiene)-block-poly(styrene)-block-Polymer X,
poly(butadiene)-block-poly(styrene)-block-Polymer X,
poly(butadiene)-block-poly(styrene)-block-Polymer X,
poly(butadiene)-block-poly(styrene)-block-Polymer X,
poly(butadiene)-block-poly(styrene)-block-Polymer X,
and the like,
where "Polymer X" is any other suitable hydrophilic third block polymer.

As mentioned above, in addition to a structure-directing block copolymer, the inventive method also uses a carbon precursor. As used herein, the term "carbon precursor" refers to an organic molecule or compound that is hydrophilic and that can combine with a hydrophilic polymer block of a block copolymer. A suitable example of a carbon precursor in accordance with the present invention includes, without limitation, a thermally cross-linkable organic molecule. Examples of suitable thermally cross-linkable organic molecules include, without limitation, resins, oligomeric resins, aromatic alcohols, unsaturated alcohols, phenol based resols, phenol-formaldehyde resols, resorcinol-formaldehyde resols, furfuryl alcohol, and mixtures thereof.

The self-assembled precursor/copolymer composite can have various types of ordered structures. The type of ordered structure is defined by the block copolymer and the ratio of the block copolymer to the carbon precursor.

In some embodiments, the ordered structure is derived from and related to triply periodic surfaces such as, but not limited to, the Schwarz primitive P surface (e.g., the so-called plumbers nightmare structure), the diamond D surface, Schoen's I-WP surface, or the Neovius surface. In some embodiments, the ordered structure represents a non-cubic structure, such as an orthorombic structure with Fddd space group symmetry (e.g., the $O^{70}$ structure found in self-assembled block copolymers).

In one embodiment, the ordered structure is a gyroidal structure having a core-shell double gyroid morphology (also referred to herein as an ordered core-shell double gyroidal structure). A precursor/copolymer composition having a core-shell double gyroid morphology can be pyrolyzed to yield a double gyroidal mesoporous carbon (which can be referred to as "$G^DMC$").

In some embodiments, the inventive method forms an ordered gyroidal structure that is an alternating gyroid morphology (also referred to herein as an ordered alternating gyroidal structure). A precursor/copolymer composition having an alternating gyroid morphology can be pyrolyzed to yield a single gyroidal mesoporous carbon (generally referred to herein as "$G^4MC$").

Precursor/copolymer compositions as used in the present invention can be customized to yield carbon anodes of different morphologies and defining different pore sizes. In a particular embodiment, this can be achieved through the use of an evaporation induced self-assembly (EISA) process of the structure directing block copolymer, e.g., poly(isoprene)-block-poly(styrene)-block-poly(ethylene oxide) (referred to herein as "ISO") with phenol- or resorcinol-formaldehyde resols as carbon precursors. Pore size tunability can be achieved by using different ISOs with similar composition, but different molar mass. The bicontinuous, ordered carbon materials show surprisingly good structure retention after heat treatment at temperatures as high as 1600° C. This high temperature stability allows for thermal tunability of the microstructure of the carbon as well as the microporosity.

In some embodiments, the block copolymer is a "diblock copolymer." As used herein, the term "diblock copolymer" generally refers to amphiphilic diblock copolymers with a hydrophilic block. For example, suitable diblock copolymers can include any of the triblock terpolymers disclosed herein, except without the first or the second block. Various examples can include, without limitation, poly(styrene)-block-poly(ethylene oxide), poly(isoprene)-block-poly(ethylene oxide), poly(styrene)-block-poly(4-vinyl pyridine), poly(isoprene)-block-poly(4-vinyl pyridine), poly(styrene)-block-poly(2-vinyl pyridine), poly(isoprene)-block-poly(2-vinyl pyridine), poly(styrene)-block-poly(glycidyl methacrylate), poly(isoprene)-block-poly(glycidyl methacrylate), poly(styrene)-block-poly(dimethyl amino ethyl methacrylate), poly(isoprene)-block-poly(dimethyl amino ethyl methacrylate), poly(styrene)-block-poly(methacrylic acid), poly(isoprene)-block-poly(methacrylic acid), and the like.

In some embodiments, the block copolymer comprises a hydrophobic block selected from the group consisting of polyacrylates and polymethacrylates. In some embodiments, the block copolymer comprises poly(methyl methacrylate) (PMMA).

EXAMPLES

The invention will now be illustrated, but not limited, by reference to the specific embodiments described in the following examples.

Solid Bicontinuous Monolithic Carbon Anode.

The carbon monoliths were synthesized using block copolymer (BCP) structure direction. The structure directing, amphiphilic triblock terpolymer poly(isoprene)-block-poly (styrene)-block-poly(ethylene oxide) (PI-b-PS-b-PEO, ISO) was synthesized in a step-wise anionic polymerization, as described previously (Bailey, T. S. et al., A Noncubic Triply Periodic Network Morphology in Poly(isoprene-B-Styrene-B-Ethylene Oxide) Triblock Copolymers. *Macromolecules* 2002, 35, 7007-7017). The ISO employed here exhibited a total molecular weight of 130 kg mol$^{-1}$, a PDI of 1.09, and respective weight fractions of 15.4%, 31.4% and 53.2% for PI, PS, and PEO. Phenol-formaldehyde resols were used as the carbon precursor and synthesized using the oligomerization of phenol and formaldehyde in a molar ratio of 1:2 under basic conditions. Monolithic ISO:resols hybrids with double gyroidal morphology were obtained by dissolution of both components (1:0.54 by weight) in tetrahydrofuran and chloroform (1:1 by weight) and drying of the solution at 50° C. in a Teflon dish. The dry films were annealed at 125° C. for 24 hours prior to carbonization at 1100° C. for 24 hours. To obtain porous surfaces after carbonization, the annealed hybrid films were exposed to argon-oxygen plasma for 40 mins. The free-standing carbon monoliths were cut into the desired shape, attached to a wire in edge-on geometry with silver epoxy (EPO-TEK H20E from EMS), and cured at 80° C. for at least 10 hours. The exposed silver contact was then sealed to the outside using silicone rubber adhesive sealant (Momentive RTV 108) and cured at room temperature for at least 24 hours.

Electrodeposition of Polymer Electrolyte Layer.

The walls and surfaces of the carbon anode were conformally coated with poly(phenylene oxide) (PPO) using self-limiting electropolymerization. The polymerization solution in acetonitrile was 0.05 M in phenol and tetramethylammonium hydroxide pentahydrate and 0.1 M in tetrabutylammonium perchlorate (TBAP). The solution was kept under inert gas atmosphere to prevent oxidation of the deprotonated phenol. A wire-connected gyroidal carbon monolith was immersed completely into the solution and left soaking for 15 mins in a septum capped vial. Electropolymerization was conducted in a three-electrode set up with a platinum counter electrode and a Ag/Ag$^+$ reference electrode (silver wire in acetonitrile with 50 mM silver perchlorate and 0.1 M TBAP). Phenol was oxidatively deposited with 200 pulses at 0.6 V vs. Ag/Ag$^+$ for a duration of 5 sec with 10 sec rest in between each pulse, followed by 20 cyclic voltamogram sweeps at 20 mV s$^{-1}$ using a Metrohm Autolab PGSTAT204. The PPO coated carbon anode was subsequently soaked in ethanol to remove excess electrolyte and dried at room temperature.

Lithiation-Delithiation of Anode-Electrolyte Intermediate Battery Assembly.

The PPO-coated carbon anode and lithium foil were immersed in 1 M lithium perchlorate in dimethyl carbonate and ethylcarbonate (1:1 by volume) in a septum capped vial under argon atmosphere. After soaking for 2 days, the carbon was galvanostatically lithiated and delithiated at 10 µA to 0 V and 2 V vs. Li/Li$^+$, respectively, in a two electrode setup using a MTI BT8 battery tester.

Cathode Material Infiltration.

Sulfur as the cathode material was backfilled into remaining pores of the PPO-coated carbon electrode through liquid/vapor infiltration at 155° C. for 24 hours. Sulfur powder was put on the carbon-PPO electrode and heated to 155° C. in a sealed flask.

Cathode Current Collector Infiltration.

Poly(ethylene dioxythiophene) (PEDOT) was backfilled and in-situ synthesized and doped inside the nanopores using oxidative polymerization. A 0.7 M iron (III) paratoluene sulfonate solution in ethanol was cooled to 4° C. EDOT was added to make a 1 M solution. The carbon-PPO-sulfur monolith was immersed in the solution without exposing the wire or connection to the solution and kept for 20 mins at 4° C. The battery assembly was subsequently removed from the solution and dried at room temperature for at least 4 hours and further dried at 80° C. for at least 6 hours. The cathode was then contacted with silver epoxy (EPO-TEK H20E from EMS) on one of the 3D-battery assembly surfaces. The cured electrical contact was again sealed to the outside with silicone rubber adhesive sealant (Momentive RTV 108).

3D Battery Lithiation and Testing.

The 3D battery assembly was immersed in 1 M lithium perchlorate in dioxolane (DOL) and dimethoxyethane (DME) (1:1 by volume) together with a lithium foil in a septum capped vial under argon atmosphere. After soaking for 2 days, the sulfur-PEDOT phase was discharged to 1 V vs. Li/Li$^+$ at a current of 10 µA. After lithiation of the cathode, the 3D-battery assembly was charged and discharged with varying rates and cut-off voltages as described in the text.

Characterization.

Scanning electron microscopy (SEM) of carbonized samples was carried out on a Zeiss LEO 1550 FE-SEM or a Tescan Mira SEM operating at an accelerating voltage of 10-20 kV. The SEM was equipped with a Bruker energy dispersive spectrometer (EDS) for elemental analysis. SAXS measurements were performed on the monolithic carbon material at the Cornell High Energy Synchrotron Source (CHESS). The sample to detector distance was 2.6 m and the X-ray wavelength, $\lambda$, was 1.2015 Å. The scattering vector, q, is defined as $q=(4\cdot\pi/\lambda)\cdot\sin\theta$, where $\theta$ is half of the scattering angle. Nitrogen sorption isotherms were obtained on a Micromeritics ASAP 2020 surface area and porosity analyzer at $-196°$ C. Lithiation and battery tests of the monolithic carbon material and composites were executed using a BST8-WA 8-channel battery analyzer from MTI Corporation. Resistances through the PPO thin film of the PPO-coated carbon monoliths and of the PEDOT and sulfur-PEDOT infiltrated insulating gyroidal mesoporous polymer frameworks were measured using cyclic voltammetry at a scan rate of 50 mV $s^{-1}$ with an AUTOLAB Metrohm Autolab PGSTAT204 The second contact for the uncoated and PPO-coated carbon monoliths were made using a liquid gallium-indium eutectic contact on one of the surfaces. Contacts for the PEDOT and sulfur-PEDOT infiltrated insulating gyroidal mesoporous polymer framework was made with silver epoxy (EPO-TEK H20E from EMS) on both surfaces.

Results.

The embodiment of the solid-state three-dimensional battery assembly made as described in the above example has a monolithic gyroidal carbon framework (mG$^D$MC) (represented by reference number 2 in FIG. 1A, which shows a portion of the carbon anode from the exemplified embodiment) as the anode active material and current collector in one. FIG. 1B shows the carbon anode after it was conformally coated through electropolymerization of poly(phenylene oxide) (PPO) as the solid polymer electrolyte 4. FIG. 1C shows the carbon anode following electrolyte coating and infiltration of sulfur and in-situ polymerized poly(ethylene dioxothiophene) (PEDOT) as the active cathode material and current collector, respectively (schematically represented as reference numeral 6, which is a single phase comprising both the active cathode material and current collector).

Figure 2:
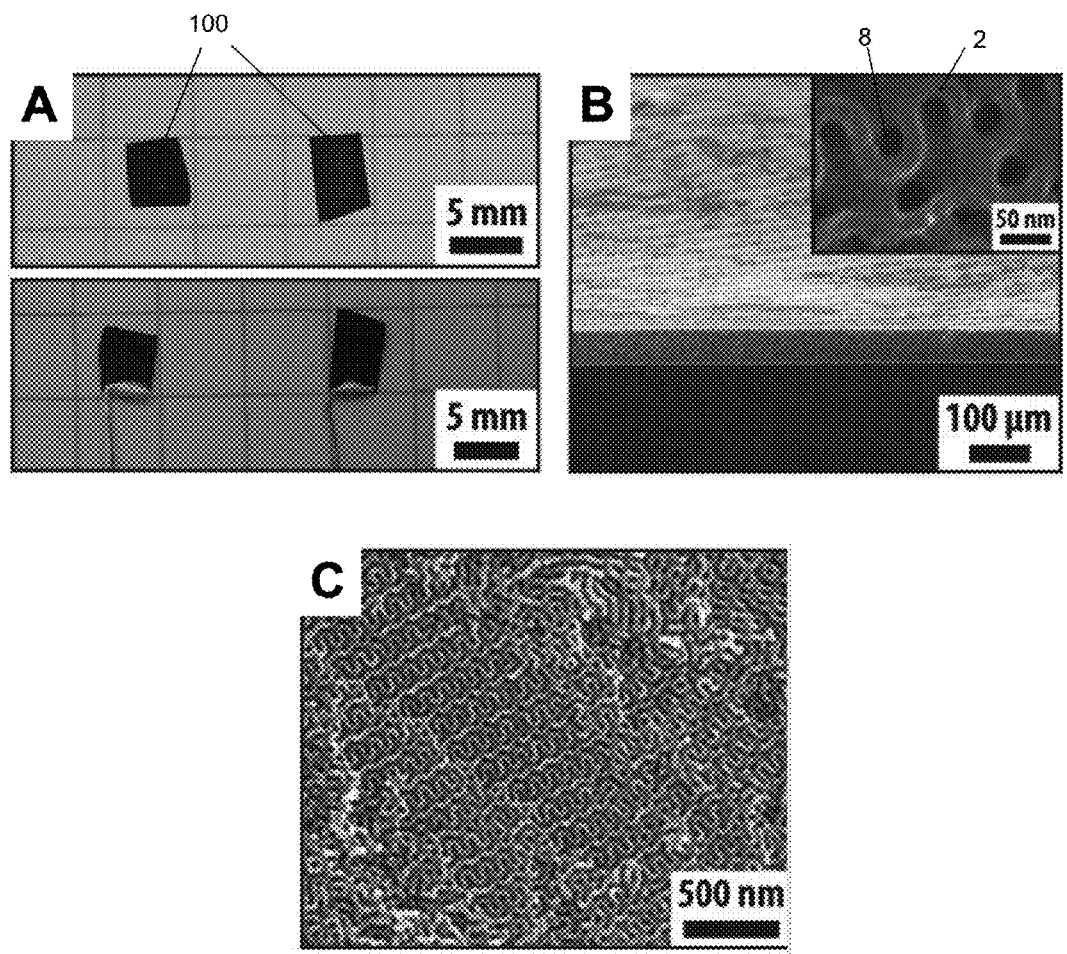
FIGS. 2A-C are images of a carbon anode according to an embodiment of the invention.
Figure 3:
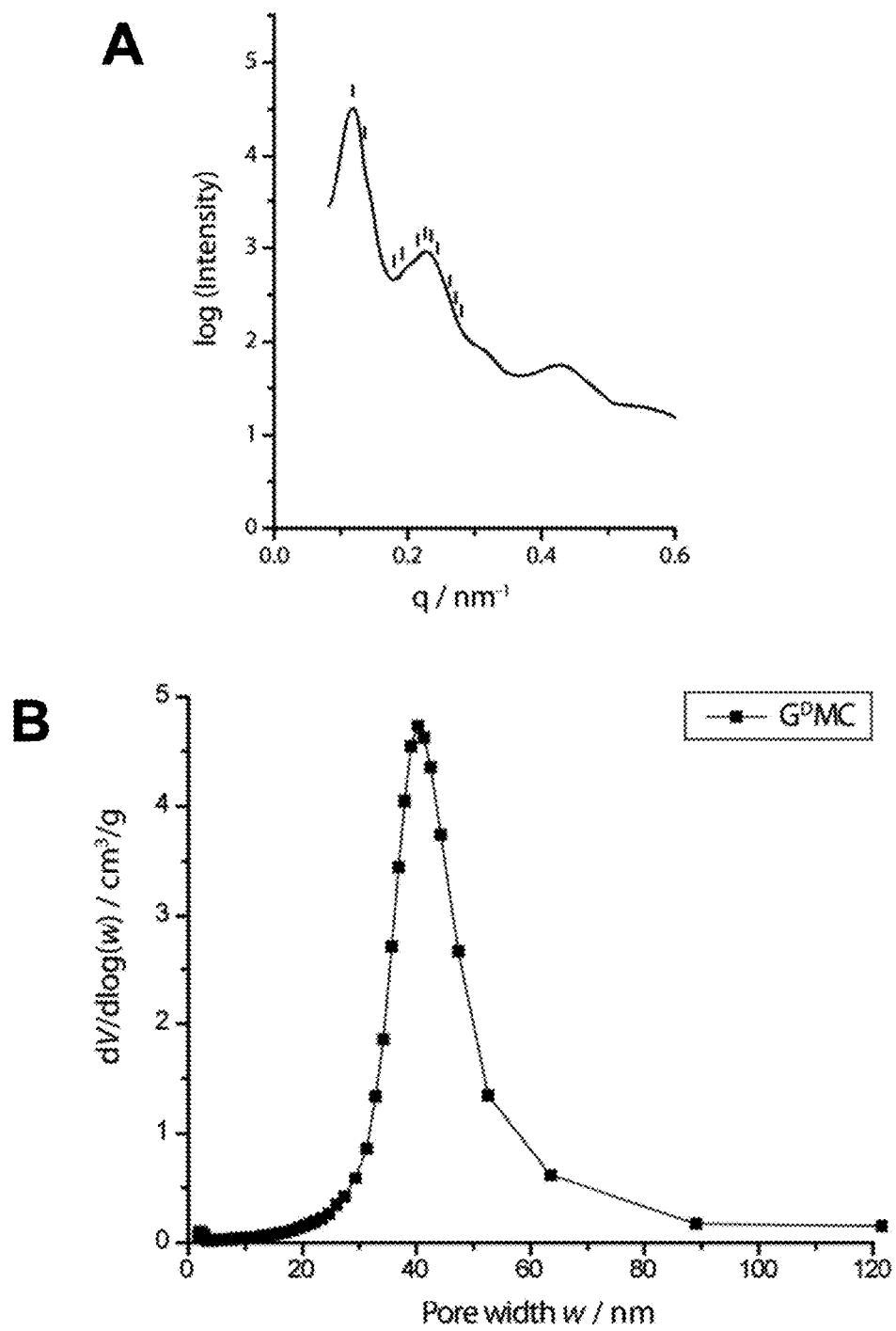
FIGS. 3A and 3B are charts showing: small-angle X-ray scattering pattern of a carbon anode according to an embodiment of the invention after pyrolysis at 1100° C.; and BJH pore size distribution derived from the nitrogen adsorption isotherm of carbon anode after pyrolysis at 1600° C. according to an embodiment of the invention, respectively.

Returning to FIG. 1A, the bicontinuous ordered three-dimensional network of the anode 2 offers a three-dimensionally homogeneous structure with two interpenetrating networks that have relatively constant cross-sectional diameter that constitute the pores in the mG$^D$MCs, separated by a the anode structure itself. The homogeneity of the gyroid morphology makes it a desirable structure for use in embodiments of the inventive solid-state three-dimensional battery assembly. As discussed above, the mG$^D$MC annode 2 was synthesized using the co-assembly of the triblock terpolymer poly(isoprene)-block-poly(styrene)-block-poly(ethylene oxide) (ISO) for structure direction and oligomeric phenol-formaldehyde resols as carbon precursor. Polymer characteristics and details of the ISO-resols co-assembly can be found, for example, in Werner, J. G. et al., Synthesis and Characterization of Gyroidal Mesoporous Carbons and Carbon Monoliths with Tunable Ultralarge Pore Size. *ACS Nano* 2014, 8, 731-743. After pyrolysis the carbonized material retains its monolithic integrity, an essential characteristic for the successful assembly of the full solid-state three-dimensional battery assembly, such as battery assembly 10 depicted in FIG. 1C, or battery assembly (3D-cell) 200 of FIG. 10A. The large-molar mass ISO (130 kDa) allowed for the synthesis of mG$^D$MC carbon anode with an ultra-large unit cell size of 131 nm, a pore size of 40 nm, and a carbon wall thickness of 16-17 nm, as shown in FIGS. 2B and 2C, and also in FIGS. 3A and 3B, which show: small-angle X-ray scattering pattern of monolithic gyroidal mesoporous carbon material after pyrolysis at 1100° C. (markings indicate the expected position for the Ia-3d space group of the double gyroid morphology with a (100) spacing of 131 nm); and BJH pore size distribution derived from the nitrogen adsorption isotherm of gyroidal mesoporous carbon material after pyrolysis at 1600° C., respectively. The pore size achieved was sufficient so as to allow enough space for the successive electrolyte coating and cathode back-filling, without bottlenecks. The pores 8 of the carbon anode 2 constitute a pore volume of 0.9 cm$^3$ g$^{-1}$ corresponding to a porosity of 64%.

It is common in block copolymer self-assembly to observe lamellar layers on surfaces of casted films due to the surface energy differences of the individual blocks and their corresponding affinity to air and the casting dish material. These lamellar capping layers were removed using plasma treatment of the polymeric-organic hybrid films prior to carbonization. This treatment makes the interior porosity accessible from the surfaces, and also causes the surface pores to be slightly smaller than in the bulk (FIG. 2B). The bulk monolithic carbon materials used in this study have thicknesses of approximately 60-70 microns and geometrical areas of 8-12 mm$^2$ (FIGS. 2A-B). The geometry leads to an average areal carbon loading of approximately 4-5 mg cm$^{-2}$ assuming a carbon density of 2 g cm$^{-3}$. The surface area of the carbon pores (approximately 130 m$^2$ g$^{-1}$) leads to an absolute surface area of 520 cm$^2$ of a carbon monolith with a geometrical footprint area of 0.1 cm$^2$. Therefore, a flat carbon anode and flat thin-film battery built upon it, with the same dimensions described here (0.4 mg carbon anode, 10-15 nm component thickness) would take up an area of 20×26 cm$^2$. As shown in FIG. 2A (bottom), the carbon monoliths 100 were attached to a wire with silver epoxy in edge-on geometry. To avoid unwanted side reactions of the silver connection in subsequent steps, the contact was sealed with silicone sealant.

As mentioned above, poly(phenylene oxide) (PPO) was used as the solid polymer electrolyte 4. The deposition thickness and molecular rejection capability of PPO is potential dependent, forming a thinner and denser film at higher potentials, comparative to other electrolyte options.

Figure 4:
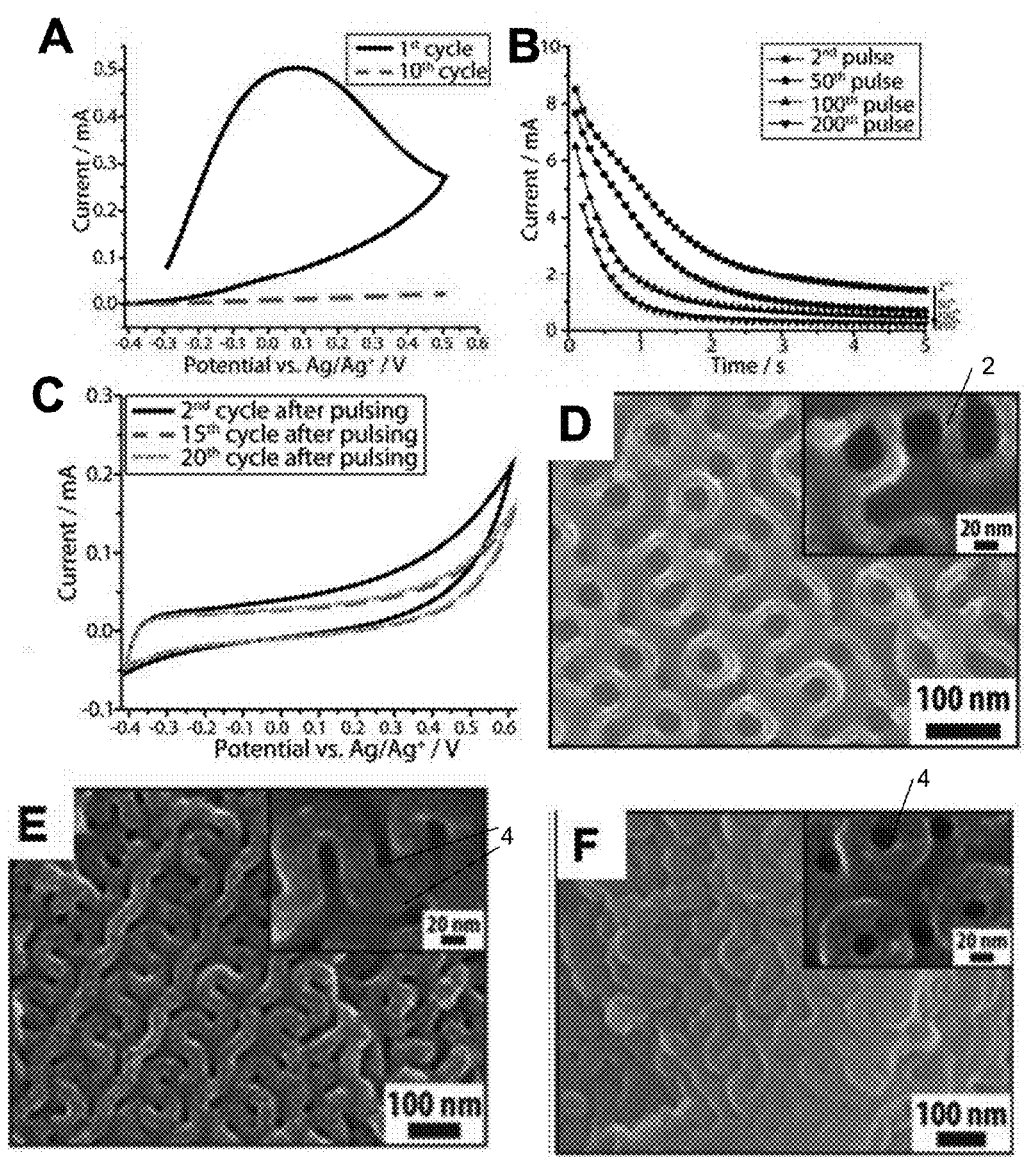
FIGS. 4A-F show charts and SEM images related to electropolymerization of an ultrathin PPO solid polymer electrolyte layer on a carbon anode according to an embodiment of the invention.

FIGS. 4A-F show charts and SEM images related to electropolymerization of an ultrathin PPO solid polymer electrolyte layer 4 on the carbon anode 2. FIG. 4A shows cyclic voltammogram (CV) of the mG$^D$MC carbon anode in the phenol electropolymerization solution. The broad oxidation peak of the first cycle disappears completely after 10 cycles. FIG. 4B shows current-time traces of selected potentiostatic deposition pulses at 0.6 V vs. Ag/Ag$^+$ showing the decrease in double layer and oxidation current. FIG. 4C shows CVs after pulsed potentiostatic PPO deposition in the same solution showing only double layer current without a phenol oxidation peak. FIGS. 4D-F are SEM images of the carbon anode before (FIG. D) and after (FIGS. E-F) pulsed potentiostatic electropolymerization of PPO. Freshly cleaved cross-sections of the anode-electrolyte intermediate battery assembly are shown in FIGS. 4D-E and the surface is shown in FIG. 4F. Insets of FIGS. 4D-F show cross-sections at higher magnification.

Figure 5:
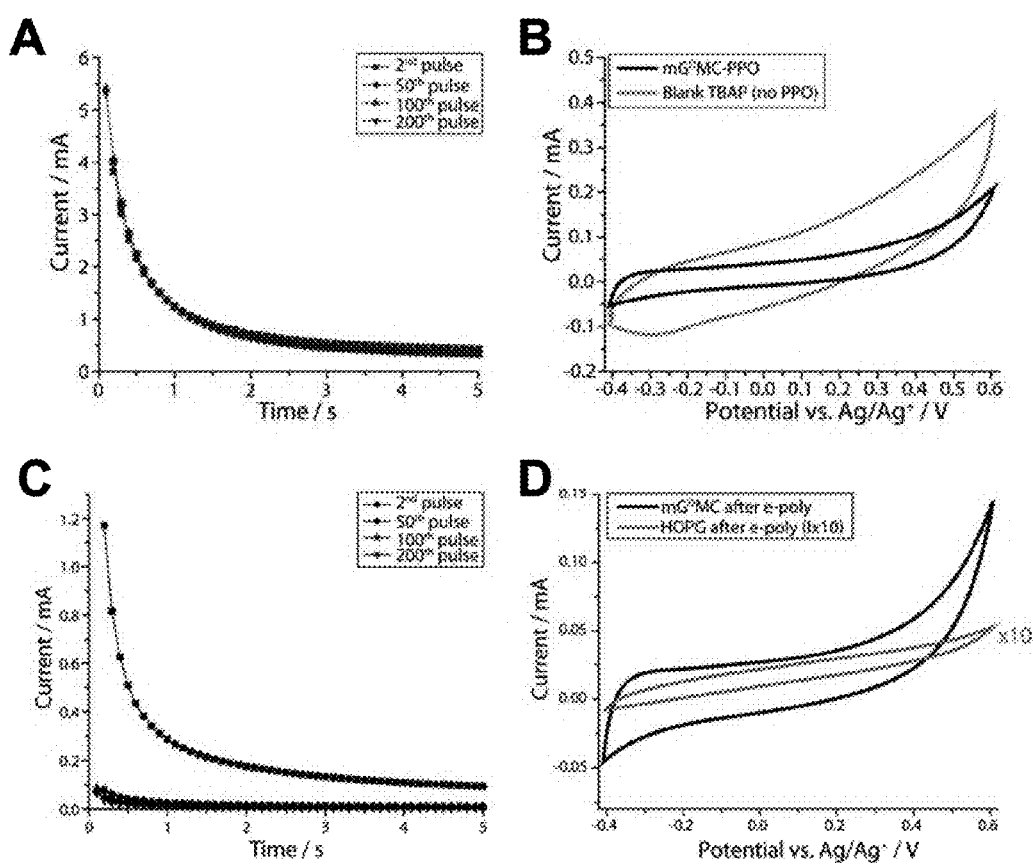
FIGS. 5A-D are charts showing current-time traces of potentiostatic pulses and CVs after potentiostatic pulses.

As shown in FIG. 4A, the electropolymerization of PPO using cyclic voltammetry at 20 mV s$^{-1}$ showed a broad oxidation peak around 0.08 V vs. Ag/Ag$^+$ that decayed rapidly over cycling. Very little indication of an oxidation peak or double layer current was present after 10 cycles, indicating the complete insulation of the carbon surface and potential overgrowth of the polymer layer, blocking the pores. To afford a thinner PPO film, potentiostatic electropolymerization at 0.6 V vs. Ag/Ag$^+$ (well above the oxidation potential of the phenolate ion and in the mass transport limit) was used. This assures that every incoming monomer experiences the same oxidizing potential on the bare carbon surface. Pulses of 5 sec at the oxidation potential were used with 10 sec of equilibration time to allow for sufficient monomer diffusion throughout the mesoporous carbon monoliths during electropolymerization. The obtained current-time response is a superposition of double layer current (decaying exponentially) at the early pulse times and oxidation current. Over 200 pulses, the initial current due to the double layer formation and the tail of the current-time trace due to monomer oxidation decay, indicating the insulation of the carbon surface (FIG. 4B). This is in strong contrast to the background response of the electrolyte, where only double layer current with little tailing and no change over 200 pulses is observed (FIG. 5A). Cyclic voltammograms (CVs) after the pulsed potentiostatic PPO deposition in the polymerization solution shows mostly double layer characteristic with no oxidation peak occurring at the oxidation potential of the phenolate ion (FIG. 4C). Some oxidation current that is present at higher potentials stabilizes over cycling, indicating no further insulation of the carbon surface. The area of the CVs after electropolymerization is smaller than in the pure electrolyte, but orders of magnitude larger than the double layer current of a flat PPO-coated carbon substrate with similar geometrical surface area (FIG. 5C). This indicates the retained accessibility of the mesoporosity after pulsed PPO electropolymerization. Scanning electron microscopy (SEM) confirms the deposition of a thin electrolyte layer 4 on the carbon anode 2, filling the pores defined by the anode (FIGS. 4E-F). The thickness of the PPO films was estimated from the wall-to-wall distance before and after electropolymerization to be around 8-10 nm. The outer surface of the carbon monoliths demonstrated open porosity after PPO deposition, confirming the electrochemical results that no pore clogging occurred using the pulsed potentiostatic method (FIG. 4F).

Figure 6:
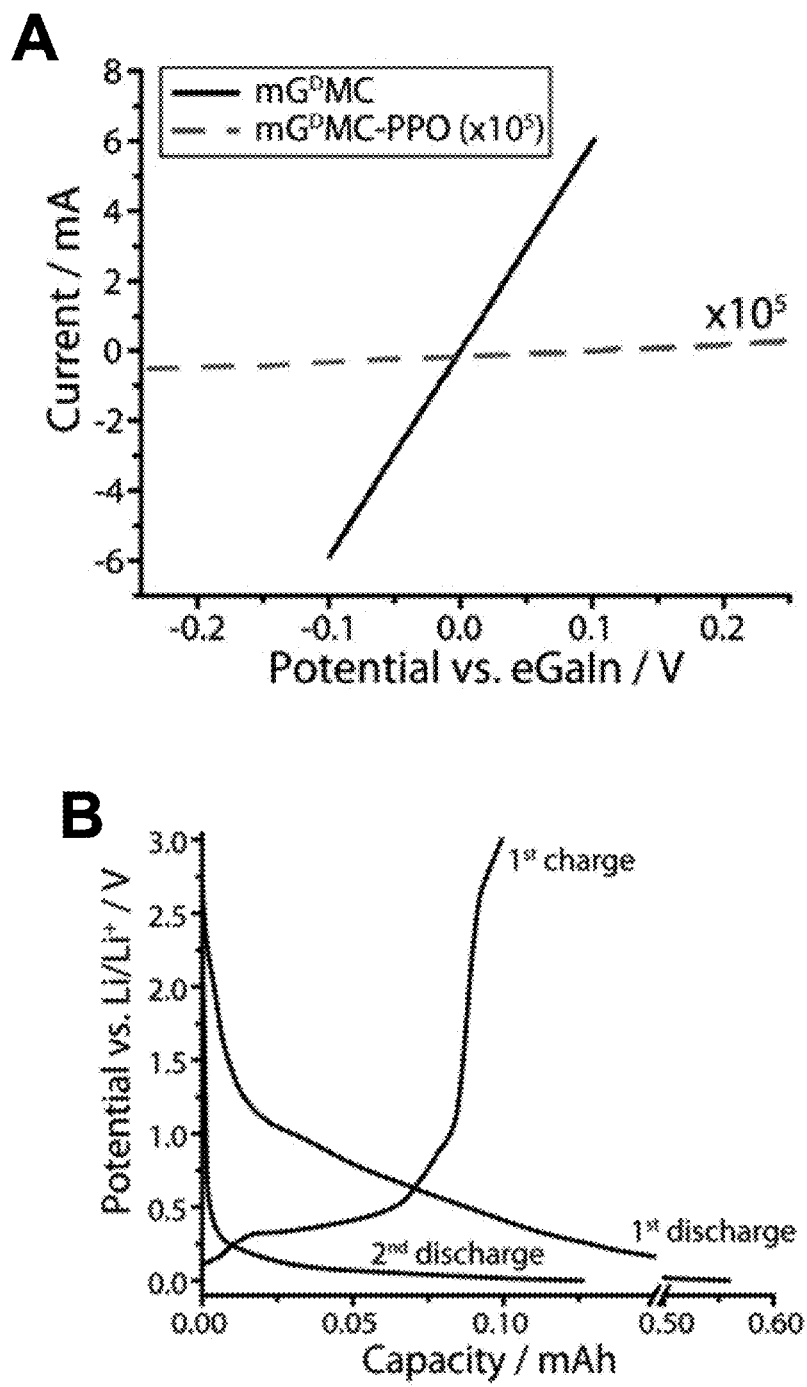
FIGS. 6A and 6B are charts showing performance test results of an ultra-thin PPO electrolyte layer according to an embodiment of the invention.
Figure 7:
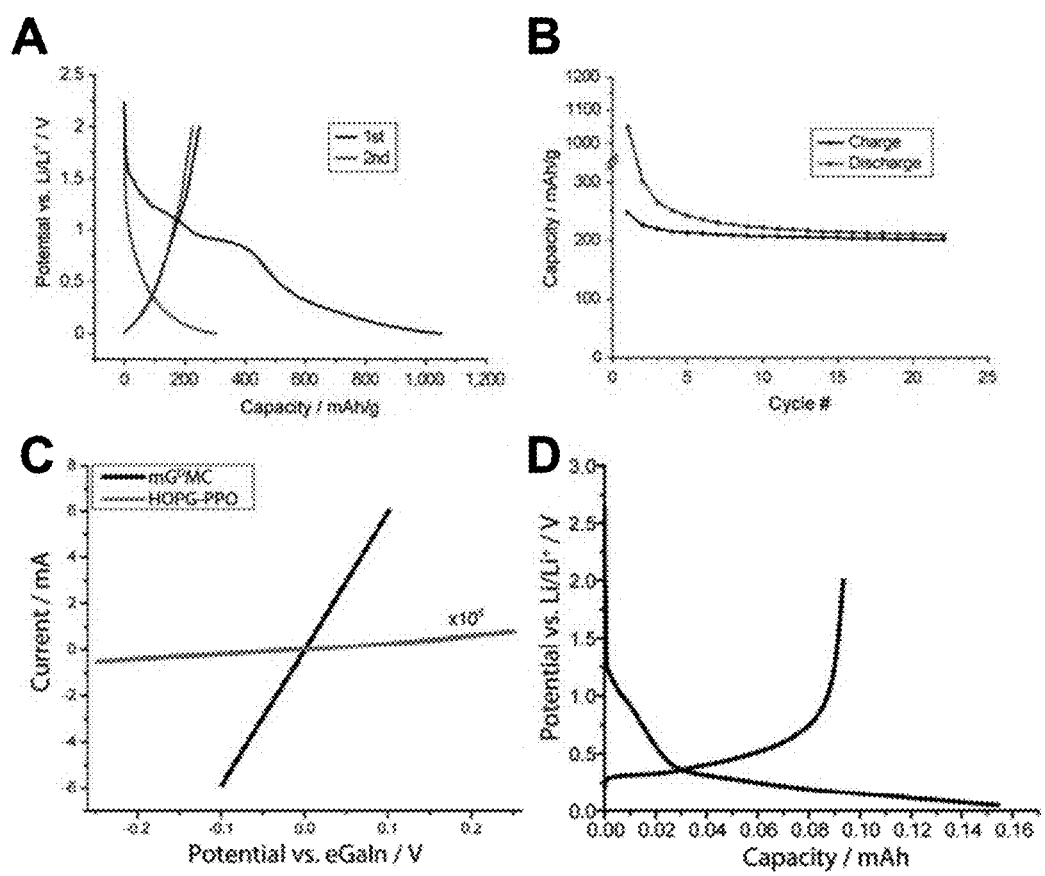
FIGS. 7A-D illustrate charge and discharge curves of the first two cycles (7A) and capacities of the first 22 cycles (7B) of powdered gyroidal carbon in a standard coin cell versus lithium metal.

The performance of the polymer electrolyte layer was evaluated using two-electrode resistance and lithiation measurements. The change in electrical resistance was measured by contacting one surface of the carbon-PPO intermediate assembly with a liquid gallium-indium eutectic (eGaIn). The slope of the potential-current curves between the carbon-connected wire and the eutectic contact corresponds to the absolute resistance through the contact area. An increase in resistance by more than 5 orders of magnitude from 17Ω to 5 MΩ due to PPO deposition was obtained (FIG. 6A). A very similar electrical resistance was measured for the flat PPO-coated carbon substrate measured in the same geometry (FIG. 7). To elucidate if the PPO-layer is permeable for lithium ions and therefore acts as an electrolyte, a gyroidal PPO-coated carbon monolith made as described above was galvanostatically lithiated and delithiated in a two-electrode liquid cell against lithium metal. After soaking in the liquid electrolyte (1 M lithium perchlorate in a 1:1 mixture of ethylene carbonate to dimethyl carbonate) for two days, the free-standing nanoporous anode-electrolyte assembly showed reversible lithiation-delithiation (FIG. 6B). The first discharge (lithiation of carbon) curve exhibits a plateau around 1 vs. Li/Li$^+$ and very large capacity as is commonly observed for the first discharge of carbon anode materials due to the built-up of the solid-electrolyte interface (SEI). The following charge (delithiation) and discharge (lithiation), however, show a capacity of 0.1 and 0.13 mAh, respectively, demonstrating reversible lithium intercalation. These capacities correspond to approximately 1 mAh cm$^2$ and 200-250 mAh g$^{-1}$, which is in good agreement with the reversible capacity observed from coin cell tests with powdered gyroidal carbon anode material without PPO-coating (FIG. 7). Again, the behavior of the flat PPO coated carbon substrate is very similar, with the exception of much less capacity associated to SEI layer formation due to the significantly smaller surface area (FIG. 7).

Figure 8:
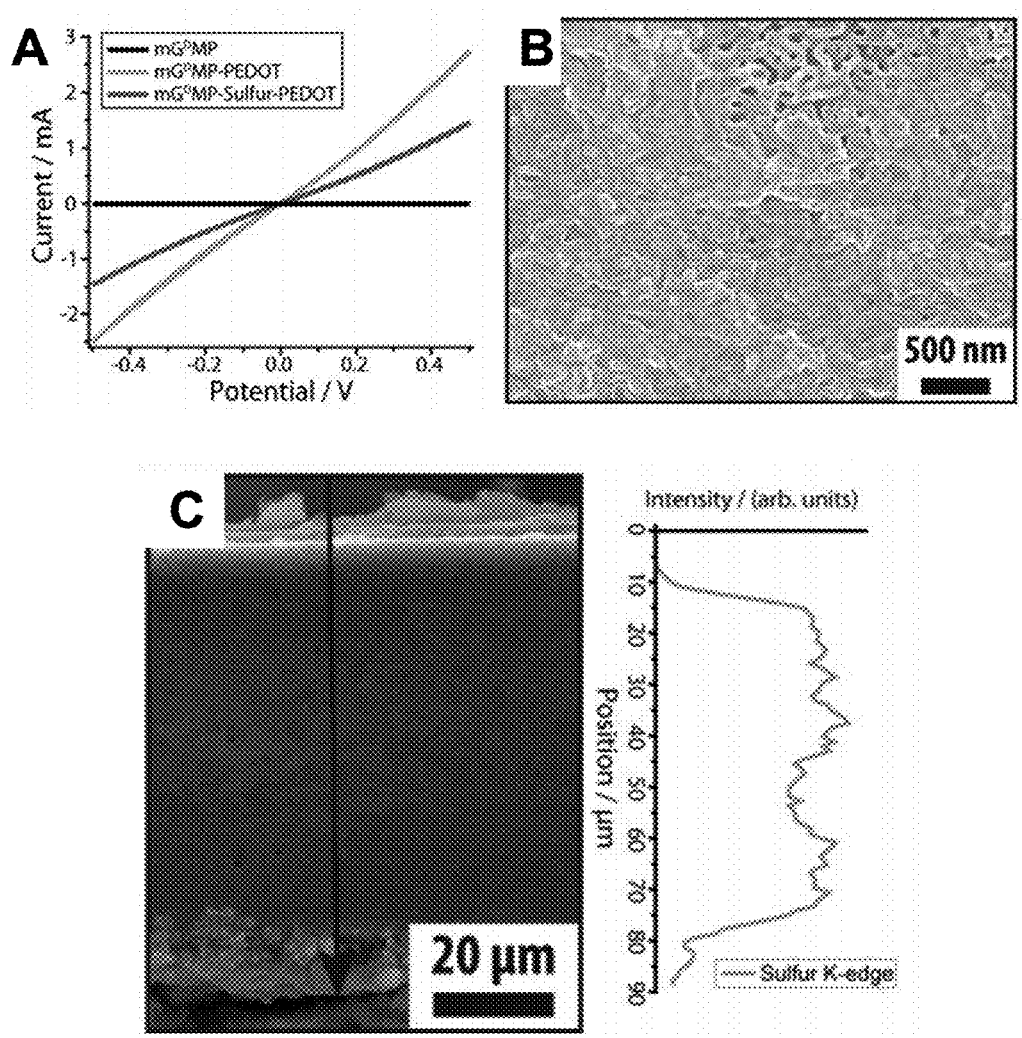
FIGS. 8A-C provide a chart and images related to cathode composite infiltration.

After successful coating of the three-dimensional carbon anode with the electrolyte layer, the remaining open porosity was infiltrated with the cathode composite. Elemental sulfur was used as the active cathode material. Sulfur exhibits an intermediate discharge voltage versus lithium metal or carbon of 2-2.5 V. Sulfur can be infiltrated into nanopores using liquid infiltration at low temperature (e.g., 155° C.). Since sulfur is electronically insulating, it was combined with another material that acts as a three-dimensionally nano-integrated current collector-poly(ethylene dioxothiophene) (PEDOT), which is a well-known conducting polymer. The monomer EDOT can be polymerized through chemical or electrochemical oxidation. The doped forms of conducting polymers are commonly insoluble and, therefore, infiltration into nanopores can be problematic. In this example, the monomer (EDOT) and a chemical oxidizing agent (iron(III) para-toluenesulfonate) were infiltrated, which led to in-situ polymerization of PEDOT inside the pores of the PPO-coated carbon monoliths. To test the functionality of the PEDOT current collector prepared by this method in a nanoporous template, the resistance across an insulating gyroidal polymer monolith after infiltration was measured (FIG. 8A). Gyroidal porous polymer monoliths (mG$^D$MP) were obtained from the same synthesis as its carbon analogue, but with heat treatment to only 450° C. At this temperature, the structure directing block copolymer ISO decomposes and forms porosity, while the phenol-formaldehyde resols convert into an electronically insulating phenolic resin (black line in FIG. 8A). The resistance decreases to 180 and 330Ω after infiltration with PEDOT, or sulfur and PEDOT, respectively. This result demonstrated the conductivity of the polymer and its percolation throughout the nanoporous framework. SEM analysis confirms good infiltration of PEDOT into the nanopores with only little porosity remaining (FIG. 8B). The complete cross-section of a PPO-coated and sulfur-PEDOT backfilled 3D-battery is shown in FIG. 8C. Thin polymer overlayers of a few microns in thickness on either surface of the monoliths can clearly be distinguished. This feature from the PEDOT infiltration-synthesis is beneficial for the subsequent contacting of the cathode composite phase, since any mechanical stress directly on the ultra-thin PPO coating could cause disruption of the separating layer and lead to short-circuiting between the anode and cathode phase. The infiltration of sulfur and the sulfur containing PEDOT appears to be fairly homogeneous throughout the entirety of the 3D-battery assembly, as revealed by the constant energy dispersive X-ray spectroscopy (EDX) signal of sulfur across the film (FIG. 8C and FIGS. 9A-B). Quantitative analysis of the EDX spectra of the three points shown in FIG. 9B estimate a carbon to sulfur ratio of 3.8, 3.0, and 3.4 at the top, middle and bottom of the film, respectively.

Figure 9:
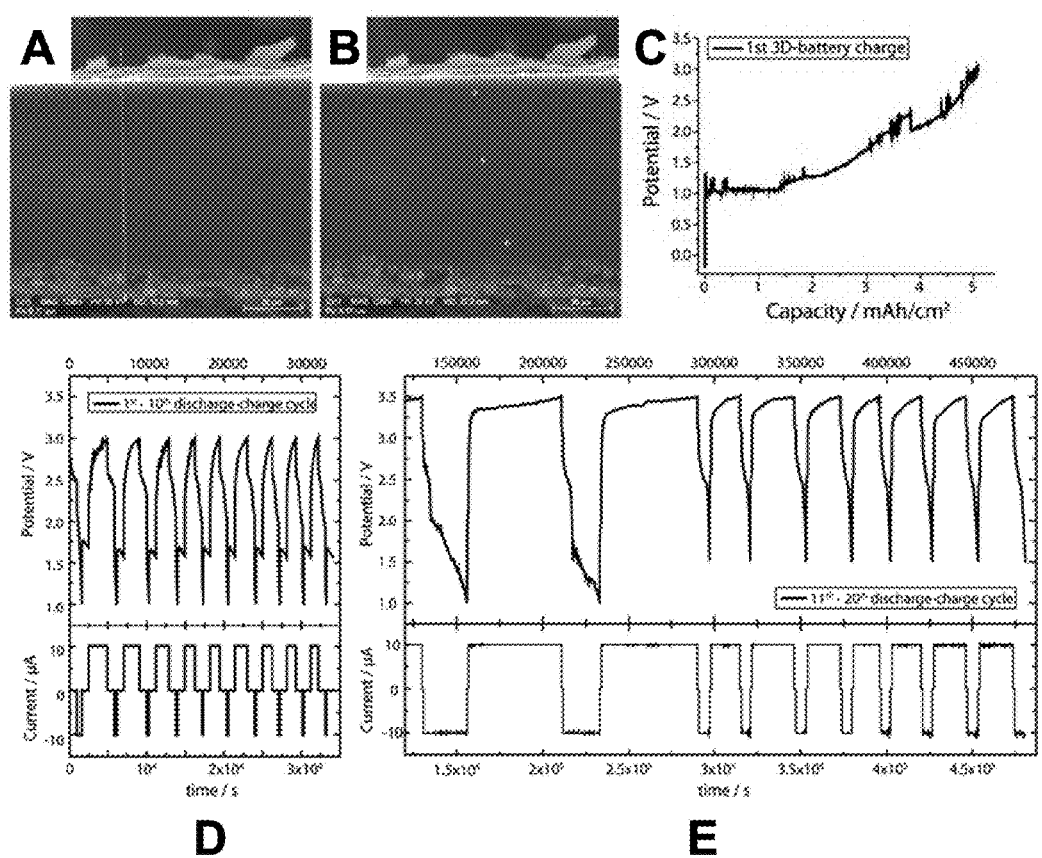
FIGS. 9A-E are SEM images and charts.
Figure 10:
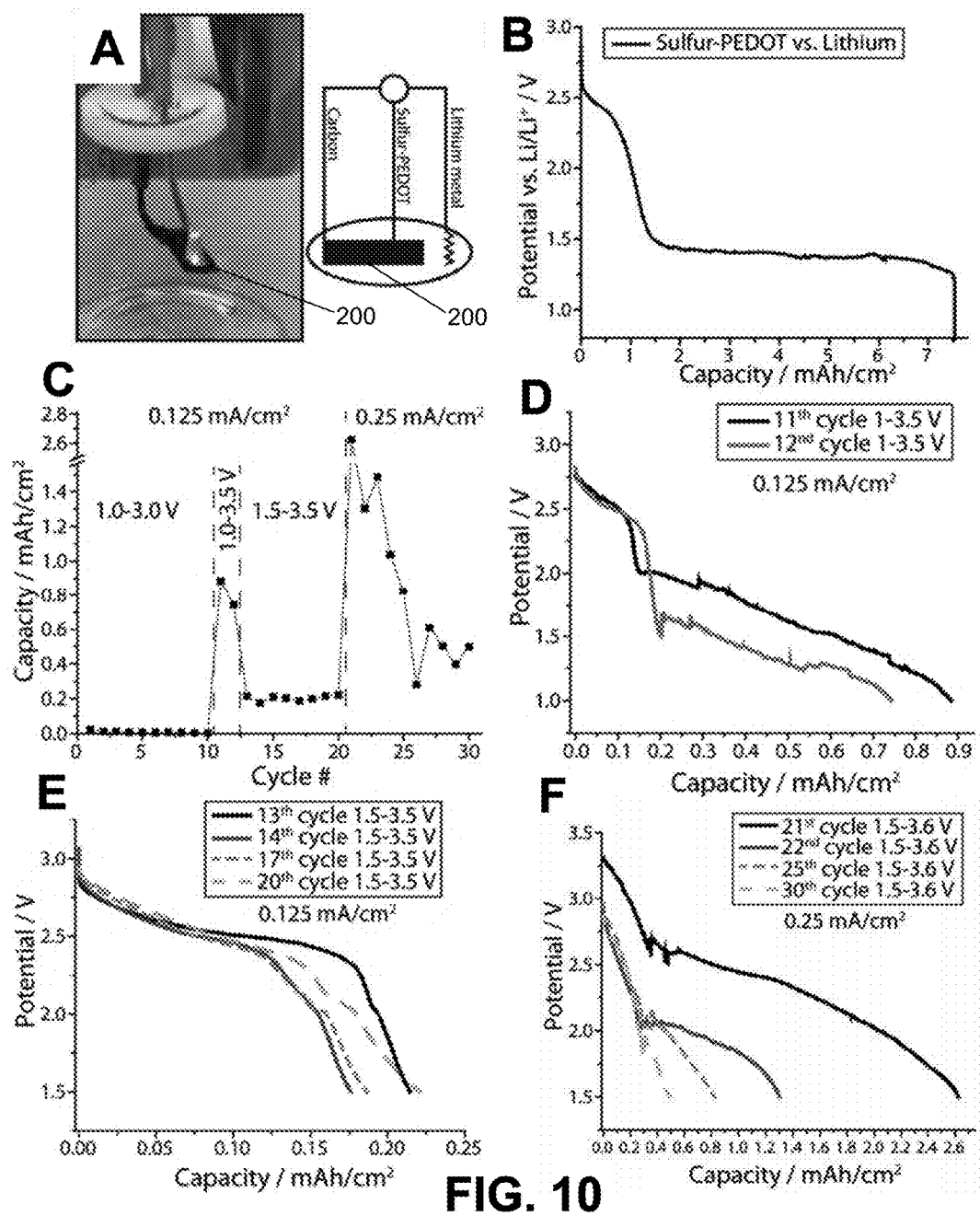
FIGS. 10A-F depict a battery assembly according to an embodiment of the invention, and charts illustrating results from performance testing performed on the battery assembly.
Figure 11:
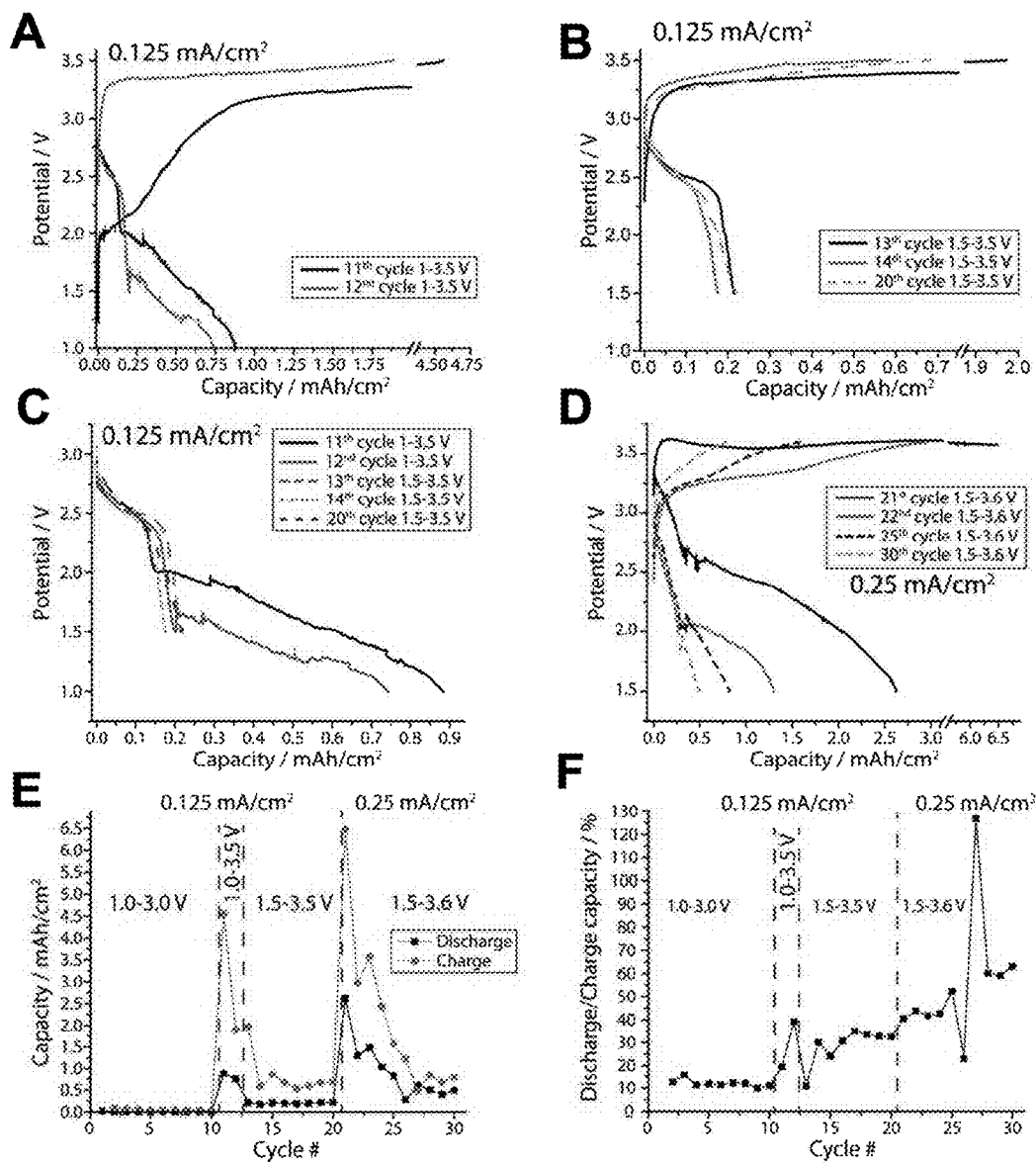
FIGS. 11A-F are charts showing charge-discharge curves, charge and discharge capacities of tested cycles, and cycle efficiencies of tested cycles.

To introduce lithium into the solid-state three-dimensional battery assembly, the sulfur-PEDOT phase was electrochemically reduced in a two-electrode configuration versus lithium metal (FIGS. 10A and 10B). A solid-state three-dimensional battery assembly with an area of 0.08 cm$^2$ was soaked for 2 days in a liquid electrolyte (1 M LiClO$_4$ in 1:1 vol DOL:DME) and then discharged at a constant current of 0.125 mA cm$^{-2}$. The electrolyte was chosen to avoid unwanted side reactions with polysulfides that carbonate-based electrolytes can undergo. The discharge curve exhibited two plateaus around 2.4 V and 1.5 V vs. Li/Li$^+$, respectively (FIG. 10B). The plateau at 2.4 V matches well with the sulfur reduction potential to form long-chain polysulfides. The second discharge plateau is well below the commonly observed one (which is around 2 V vs. Li/Li$^+$). The large overpotential, however, is expected as PEDOT becomes insulating at these low potentials. This "external" reduction-lithiation of the sulfur-PEDOT phase was followed by cycling of the solid-state three-dimensional battery assembly at a constant current of 0.125 mA cm$^{-2}$ (carbon vs. lithiated sulfur-PEDOT, FIGS. 10C-F and FIGS. 9 and 11). After the first charge to 3 V (Figure S4c), the cell was cycled 10 times between 1 and 3 V with very little discharge capacity obtained (FIG. 10C and FIG. 9D). After these initial cycles, the 3D-battery assembly was removed from the liquid electrolyte and cycled between 1 and 3.5 V for two cycles (FIG. 10D, FIG. 11A). The discharge curves exhibited a reversible plateau around 2.5 Volts with a capacity of 0.12-0.18 mAh cm$^{-2}$ and further capacity at lower potentials. To investigate the reversibility of the plateau at 2.5 V, the voltage window was decreased to 1.5-3.5 V in subsequent cycles. The next 8 cycles showed reversible discharge capacities of 0.18-0.23 mAh cm$^{-2}$ at a constant current of 0.125 mA cm$^{-2}$ from the discharge plateau at 2.5 V. This data clearly demonstrates reversible charge and discharge of the solid-state three-dimensional battery assembly. The subsequent 10 cycles were run at a current of 0.25 mA cm$^{-2}$ between 1.5 and 3.6 V. Again, reversible capacity for the first discharge plateau of approximately 0.25-0.31 mAh cm$^{-2}$ was observed, together with a high total capacity of 2.6 mAh cm$^{-2}$ for the first cycle at this current rate. The second discharge plateau, however, showed decreasing capacity retention over the subsequent cycles. The reoccurrence of the second discharge plateau above 1.5 V is most likely due to the increased cut-off voltage for charging the 3D-battery at the higher current rate, which leads to a much higher charge capacity (FIG. 11D). The current rate also influenced the coulombic efficiency of the solid-state three-dimensional battery cell, which is expressed as the ratio of discharge over charge capacity (FIGS. 11E, 11F). The capacity discrepancy between charge and discharge is possibly due to some leakage current through the polymer separator. This is expected to be mitigated at higher charging and discharging rates, as was observed for the 3D-battery.

The foregoing examples and results demonstrate the successful synthesis and assembly of a working all-nano-integrated solid-state three-dimensional battery assembly.

Clauses

The following clauses describe certain non-limiting embodiments of the invention.

1. A solid-state three-dimensional battery assembly comprising:

a solid bicontinuous monolithic carbon anode having an ordered three-dimensionally continuous network nanostructure, said anode having a length of at least 100 nm, and an average thickness of 3 to 90 nm, wherein the ordered three-dimensionally continuous network nanostructure of the anode defines a plurality of pores having an average diameter of 5 to 100 nm;

a solid electrolyte layer disposed directly on the anode, filling a portion of the pores defined by the ordered three-dimensionally continuous network nanostructure of the anode, said electrolyte layer being pinhole-free, ion-conducting but electronically insulating, and having an average thickness of 3 to 90 nm; and a solid cathode disposed directly on the electrolyte layer, filling a portion of the pores defined by the ordered three-dimensionally continuous network nanostructure of the anode, having an average thickness of 3 to 90 nm, said cathode comprising:

an active cathode material selected from the group consisting of sulfur, selenium, redox-active polymer, and a lithium metal oxide; and a current collector material selected from the group consisting of metals, carbon, and a conducting polymer, wherein the electrolyte layer is sandwiched between the anode and the cathode.

2. The solid-state three-dimensional battery assembly according to clause 1, wherein the anode or the cathode is lithiated and present in reduced state.

3A. The solid-state three-dimensional battery assembly according to any one of the preceding clauses, wherein the anode is lithiated and present in reduced state.

3B. The solid-state three-dimensional battery assembly according to any one of the preceding clauses, wherein the cathode is lithiated and present in reduced state.

4. The solid-state three-dimensional battery assembly according to any one of the preceding clauses, wherein the cathode comprises sulfur and poly(ethylene dioxothiophene).

5. The solid-state three-dimensional battery assembly according to clause 4, wherein the sulfur is lithiated.

6. The solid-state three-dimensional battery assembly according to any one of the preceding clauses, wherein the electrolyte layer comprises poly(phenylene oxide).

7. The solid-state three-dimensional battery assembly according to any one of the preceding clauses, wherein the pores defined by the ordered three-dimensionally continuous network nanostructure of the anode have an average diameter of 5 to 70 nm.

8. The solid-state three-dimensional battery assembly according to clause 7, wherein the pores defined by the ordered three-dimensionally continuous network nanostructure of the anode have an average diameter of 10 to 50 nm.

9A. The solid-state three-dimensional battery assembly according to any one of the preceding clauses, wherein the pores defined by the ordered three-dimensionally continuous network nanostructure of the anode have an average diameter of greater than 12 nm.

9B. The solid-state three-dimensional battery assembly according to any one of clauses 1 to 6, wherein the pores defined by the ordered three-dimensionally continuous network nanostructure of the anode have an average diameter of less than 95 nm.

10. The solid-state three-dimensional battery assembly according to any one of the preceding clauses, wherein the anode has an average thickness of less than 20 nm.

11. The solid-state three-dimensional battery assembly according to any one of the preceding clauses, wherein the electrolyte layer has an average thickness of less than 20 nm.

12. The solid-state three-dimensional battery assembly according to any one of the preceding clauses, wherein the cathode has an average thickness of less than 20 nm.

13A. The solid-state three-dimensional battery assembly according to any one of the preceding clauses, wherein the anode, electrolyte layer, and cathode collectively occupy at least 85 vol % of said battery assembly.

13B. The solid-state three-dimensional battery assembly according to any one of the preceding clauses, wherein the anode, electrolyte layer, and cathode collectively occupy at least 90 vol % of said battery assembly.

13C. The solid-state three-dimensional battery assembly according to any one of the preceding clauses, wherein the anode, electrolyte layer, and cathode collectively occupy at least 95 vol % of said battery assembly.

14A. The solid-state three-dimensional battery assembly according to any one of the preceding clauses, wherein:
the anode occupies 20 to 60 vol % of the battery assembly;
the electrode layer occupies 10 to 50 vol % of the battery assembly; and
the cathode occupies 20 to 60 vol % of the battery assembly.

15. The solid-state three-dimensional battery assembly according to any one of the preceding clauses, wherein the ordered three-dimensionally continuous network nanostructure is a gyroidal structure.

16. The solid-state three-dimensional battery assembly according to any one of the preceding clauses, wherein the ordered three-dimensionally continuous network nanostructure comprises a double gyroidal morphology or a single gyroidal morphology.

17. The solid-state three-dimensional battery assembly according to any one of the preceding clauses, wherein the anode has a repeat distance of 20 to 100 nm.

18. The solid-state three-dimensional battery assembly according to any one of the preceding clauses, wherein the anode and cathode are connected in a circuit.

19. A device comprising the solid-state three-dimensional battery assembly according to any one of the preceding clauses.

20. A method of making a solid-state three-dimensional battery assembly according to any one of clauses 1 to 18, or a device according to clause 19, said method comprising:
combining a carbon precursor and a structure-directing block copolymer to yield a self-assembled precursor/copolymer composite having an ordered three-dimensionally continuous network nanostructure that is defined by the block copolymer and the ratio of the block copolymer to the carbon precursor;
treating the precursor/copolymer composite to remove the block copolymer, then carbonizing the carbon precursor, thereby yielding the carbon anode having an ordered three-dimensionally continuous network nanostructure;
coating the carbon anode with a 3 to 90 nm thick pin-hole free solid electrolyte layer, thereby forming an intermediate battery assembly with open pores remaining therein; and
backfilling the intermediate battery assembly with a cathode comprising active cathode material and current collector.

21. The method according to clause 20, wherein the combining and treating steps comprise a solvent evaporation induced self-assembly (EISA) process.

22. The method according to clause 21, wherein the EISA process comprises:
dissolving the block copolymer and the carbon precursor in a solvent to yield a block copolymer/carbon precursor mixture;
casting the mixture (e.g., in a mold, or using roll-to-roll processing of the polymer solution, or doctor blading) to yield a copolymer/carbon precursor casted component having a desired form;
evaporating the solvent from the block copolymer/carbon precursor casted component;
optionally inducing crosslinking of the carbon precursor contained in the casted component; and
pyrolyzing the casted component to remove the block copolymer, thereby yielding the ordered three-dimensionally continuous network nanostructure.

23. The method according to clause 22, wherein the solvent is selected from the group consisting organic solvents, polar organic solvents, protic organic solvents, and mixtures thereof.

24. The method according to any one of clauses 20 to 23, wherein the block copolymer is poly(isoprene)-b-poly(styrene)-b-poly(ethylene oxide) (ISO).

25. The method according to any one of clauses 20 to 23, wherein the block copolymer is a triblock terpolymer selected from the group consisting of:
poly(isoprene)-block-poly(styrene)-block-poly(ethylene oxide),
poly(isoprene)-block-poly(styrene)-block-poly(4-vinyl pyridine),
poly(isoprene)-block-poly(styrene)-block-poly(2-vinyl pyridine),
poly(isoprene)-block-poly(styrene)-block-poly(glycidyl methacrylate),
poly(isoprene)-block-poly(styrene)-block-poly(dimethyl amino ethyl methacrylate),
poly(isoprene)-block-poly(styrene)-block-poly(methacrylic acid),
poly(butadiene)-block-poly(styrene)-block-poly(ethylene oxide),
poly(butadiene)-block-poly(styrene)-block-poly(4-vinyl pyridine),
poly(butadiene)-block-poly(styrene)-block-poly(2-vinyl pyridine),
poly(butadiene)-block-poly(styrene)-block-poly(glycidyl methacrylate),
poly(butadiene)-block-poly(styrene)-block-poly(dimethyl amino ethyl methacrylate),
poly(butadiene)-block-poly(styrene)-block-poly(methacrylic acid),
poly(isoprene)-block-poly(styrene)-block-Polymer X,
poly(isoprene)-block-poly(styrene)-block-Polymer X,
poly(isoprene)-block-poly(styrene)-block-Polymer X,
poly(isoprene)-block-poly(styrene)-block-Polymer X,
poly(isoprene)-block-poly(styrene)-block-Polymer X,
poly(isoprene)-block-poly(styrene)-block-Polymer X,
poly(butadiene)-block-poly(styrene)-block-Polymer X,
poly(butadiene)-block-poly(styrene)-block-Polymer X,
poly(butadiene)-block-poly(styrene)-block-Polymer X,
poly(butadiene)-block-poly(styrene)-block-Polymer X,
poly(butadiene)-block-poly(styrene)-block-Polymer X, and
poly(butadiene)-block-poly(styrene)-block-Polymer X, wherein Polymer X comprises a hydrophilic third block polymer.

26. The method according to any one of clauses 20 to 25, wherein the carbon precursor comprises a hydrophilic molecule that forms hydrogen bonds with a hydrophilic block of the block copolymer.

27. The method according to clause 26, wherein the hydrophilic block of the block copolymer is poly(ethylene oxide).

28. The method according to any one of clauses 20 to 27, wherein the carbon precursor comprises a thermally cross-linkable organic molecule selected from the group consisting of resins, oligomeric resins, aromatic alcohols, unsaturated alcohols, phenol based resols, phenol-formaldehyde resols, resorcinol-formaldehyde resols, furfuryl alcohol, and mixtures thereof.

29. The method according to any one of clauses 20 to 23, wherein the block copolymer is poly(isoprene)-b-poly(styrene)-b-poly(ethylene oxide) (ISO) and the carbon precursor is a phenol-formaldehyde resol.

30. The method according to any one of clauses 20 to 29, wherein the molecular mass (g/mol) ratio of the block copolymer to the carbon precursor is greater than or equal to 2:1 or less than or equal to 3,000:1, including any and all ranges and subranges therein 31. The method according to any one of clauses 20 to 30, wherein said backfilling comprises at least one process selected from the group consisting of liquid infiltration and solution infiltration.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), "contain" (and any form contain, such as "contains" and "containing"), and any other grammatical variant thereof, are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device or article that "comprises", "has", "includes" or "contains" one or more features possesses those one or more features, but is not limited to possessing only those one or more features.

As used herein, the terms "comprising," "has," "including," "containing," and other grammatical variants thereof encompass the terms "consisting of" and "consisting essentially of."

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present invention have been described and depicted herein, alternative aspects and embodiments may be affected by those skilled in the art to accomplish the same objectives. Accordingly, this disclosure and the appended claims are intended to cover all such further and alternative aspects and embodiments as fall within the true spirit and scope of the invention.

The invention claimed is:

1. A solid-state three-dimensional battery assembly comprising:
   a solid bicontinuous monolithic carbon anode having an ordered three-dimensionally continuous network nanostructure, said anode having a length of at least 100 nm, and an average thickness of 3 to 90 nm, wherein the ordered three-dimensionally continuous network nanostructure of the anode defines a plurality of pores having an average diameter of 5 to 100 nm;
   a solid electrolyte layer disposed directly on the anode, filling a portion of the pores defined by the ordered three-dimensionally continuous network nanostructure of the anode, said electrolyte layer being pinhole-free, ion-conducting but electronically insulating, and having an average thickness of 3 to 90 nm; and
   a solid cathode disposed directly on the electrolyte layer, filling a portion of the pores defined by the ordered three-dimensionally continuous network nanostructure of the anode, having an average thickness of 3 to 90 nm, said cathode comprising:
      an active cathode material selected from the group consisting of sulfur, selenium, redox-active polymer, and a lithium metal oxide; and
      a current collector material selected from the group consisting of metals, carbon, and a conducting polymer,
   wherein the electrolyte layer is sandwiched between the anode and the cathode, and wherein the anode has a repeat distance of 20 to 100 nm.

2. The solid-state three-dimensional battery assembly according to claim 1, wherein the anode or the cathode is lithiated and present in reduced state.

3. The solid-state three-dimensional battery assembly according to claim 1, wherein the cathode is lithiated and present in reduced state.

4. The solid-state three-dimensional battery assembly according to claim 1, wherein the cathode comprises sulfur and poly(ethylene dioxothiophene).

5. The solid-state three-dimensional battery assembly according to claim 4, wherein the sulfur is lithiated.

6. The solid-state three-dimensional battery assembly according to claim 1, wherein the electrolyte layer comprises poly(phenylene oxide).

7. The solid-state three-dimensional battery assembly according to claim 1, wherein the pores defined by the ordered three-dimensionally continuous network nanostructure of the anode have an average diameter of 5 to 70 nm.

8. The solid-state three-dimensional battery assembly according to claim 1, wherein the pores defined by the ordered three-dimensionally continuous network nanostructure of the anode have an average diameter of greater than 12 nm.

9. The solid-state three-dimensional battery assembly according to claim 1, wherein the anode has an average thickness of less than 20 nm.

10. The solid-state three-dimensional battery assembly according to claim 1, wherein the electrolyte layer has an average thickness of less than 20 nm.

11. The solid-state three-dimensional battery assembly according to claim 1, wherein the cathode has an average thickness of less than 20 nm.

12. The solid-state three-dimensional battery assembly according to claim 1, wherein the anode, electrolyte layer, and cathode collectively occupy at least 95 vol % of said battery assembly.

13. The solid-state three-dimensional battery assembly according to claim 1, wherein:
the anode occupies 20 to 60 vol % of the battery assembly;
the electrode occupies 10 to 50 vol % of the battery assembly; and
the cathode occupies 20 to 60 vol % of the battery assembly.

14. The solid-state three-dimensional battery assembly according to claim 1, wherein the ordered three-dimensionally continuous network nanostructure is a gyroidal structure.

15. The solid-state three-dimensional battery assembly according to claim 1, wherein the anode and cathode are connected in a circuit.

16. A device comprising the solid-state three-dimensional battery assembly according to claim 1.

17. A method of making a solid-state three-dimensional battery assembly, wherein the battery assembly comprises:
a solid bicontinuous monolithic carbon anode having an ordered three-dimensionally continuous network nanostructure, said anode having a length of at least 100 nm, and an average thickness of 3 to 90 nm, wherein the ordered three-dimensionally continuous network nanostructure of the anode defines a plurality of pores having an average diameter of 5 to 100 nm;
a solid electrolyte layer disposed directly on the anode, filling a portion of the pores defined by the ordered three-dimensionally continuous network nanostructure of the anode, said electrolyte layer being pinhole-free, ion-conducting but electronically insulating, and having an average thickness of 3 to 90 nm; and
a solid cathode disposed directly on the electrolyte layer, filling a portion of the pores defined by the ordered three-dimensionally continuous network nanostructure of the anode, having an average thickness of 3 to 90 nm, said cathode comprising:
an active cathode material selected from the group consisting of sulfur, selenium, redox-active polymer, and a lithium metal oxide; and
a current collector material selected from the group consisting of metals, carbon, and a conducting polymer,
wherein the electrolyte layer is sandwiched between the anode and the cathode,
said method comprising:
combining a carbon precursor and a structure-directing block copolymer to yield a self-assembled precursor/copolymer composite having an ordered three-dimensionally continuous network nanostructure that is defined by the block copolymer and the ratio of the block copolymer to the carbon precursor;
treating the precursor/copolymer composite to remove the block copolymer, then carbonizing the carbon precursor, thereby yielding the carbon anode having an ordered three-dimensionally continuous network nanostructure;
coating the carbon anode with a 3 to 90 nm thick pin-hole free solid electrolyte layer, thereby forming an intermediate battery assembly with open pores remaining therein; and
backfilling the intermediate battery assembly with a cathode material comprising active cathode material and current collector.

18. The method according to claim 17, wherein the combining and treating steps comprise a solvent evaporation induced self-assembly (EISA) process.

19. The method according to claim 18, wherein the EISA process comprises:
dissolving the block copolymer and the carbon precursor in a solvent to yield a block copolymer/carbon precursor mixture;
casting the mixture in a mold, or using roll-to-roll processing of the polymer solution, or doctor blading to yield a copolymer/carbon precursor casted component having a desired form;
evaporating the solvent from the block copolymer/carbon precursor casted component;
optionally inducing crosslinking of the carbon precursor contained in the casted component; and
pyrolyzing the casted component to remove the block copolymer, thereby yielding the ordered three-dimensionally continuous network nanostructure.

20. The method according to claim 17, wherein the block copolymer is selected from the group consisting of:
poly(isoprene)-block-poly(styrene)-block-poly(ethylene oxide),
poly(isoprene)-block-poly(styrene)-block-poly(4-vinyl pyridine),
poly(isoprene)-block-poly(styrene)-block-poly(2-vinyl pyridine),
poly(isoprene)-block-poly(styrene)-block-poly(glycidyl methacrylate),
poly(isoprene)-block-poly(styrene)-block-poly(dimethyl amino ethyl methacrylate),
poly(isoprene)-block-poly(styrene)-block-poly(methacrylic acid),
poly(butadiene)-block-poly(styrene)-block-poly(ethylene oxide),
poly(butadiene)-block-poly(styrene)-block-poly(4-vinyl pyridine),
poly(butadiene)-block-poly(styrene)-block-poly(2-vinyl pyridine),
poly(butadiene)-block-poly(styrene)-block-poly(glycidyl methacrylate),
poly(butadiene)-block-poly(styrene)-block-poly(dimethyl amino ethyl methacrylate),
poly(butadiene)-block-poly(styrene)-block-poly(methacrylic acid),
poly(isoprene)-block-poly(styrene)-block-Polymer X,
poly(isoprene)-block-poly(styrene)-block-Polymer X,
poly(isoprene)-block-poly(styrene)-block-Polymer X,
poly(isoprene)-block-poly(styrene)-block-Polymer X,
poly(isoprene)-block-poly(styrene)-block-Polymer X,
poly(isoprene)-block-poly(styrene)-block-Polymer X,
poly(butadiene)-block-poly(styrene)-block-Polymer X,
poly(butadiene)-block-poly(styrene)-block-Polymer X,
poly(butadiene)-block-poly(styrene)-block-Polymer X,
poly(butadiene)-block-poly(styrene)-block-Polymer X,
poly(butadiene)-block-poly(styrene)-block-Polymer X, and poly(butadiene)-block-poly(styrene)-block-Polymer X, wherein Polymer X comprises a hydrophilic third block polymer.

21. The method according to claim 17, wherein the carbon precursor comprises a hydrophilic molecule that forms hydrogen bonds with a hydrophilic block of the block copolymer.

22. The method according to claim 17, wherein the carbon precursor comprises a thermally cross-linkable organic molecule selected from the group consisting of resins, oligomeric resins, aromatic alcohols, unsaturated alcohols, phenol based resols, phenol-formaldehyde resols, resorcinol-formaldehyde resols, furfuryl alcohol, and mixtures thereof.

23. The method according to claim 17, wherein the block copolymer is poly(isoprene)-b-poly(styrene)-b-poly(ethylene oxide) (ISO) and the carbon precursor is a phenol-formaldehyde resol.

24. The method according to claim 17, wherein the molecular mass (g/mol) ratio of the block copolymer to the carbon precursor is greater than or equal to 2:1 or less than or equal to 3,000:1.

25. The method according to claim 17, wherein said backfilling comprises at least one process selected from the group consisting of liquid infiltration and solution infiltration.

* * * * *